（12）United States Patent
Fujikawa

(10) Patent No.: US 9,875,699 B2
(45) Date of Patent: *Jan. 23, 2018

(54) DISPLAY DEVICE

(71) Applicant: Sharp Kabushiki Kaisha, Osaka-shi, Osaka (JP)

(72) Inventor: Yohsuke Fujikawa, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 303 days.

This patent is subject to a terminal disclaimer.

(21) Appl. No.: 14/761,974

(22) PCT Filed: Feb. 13, 2014

(86) PCT No.: PCT/JP2014/053252
§ 371 (c)(1),
(2) Date: Jul. 20, 2015

(87) PCT Pub. No.: WO2014/132799
PCT Pub. Date: Sep. 4, 2014

(65) Prior Publication Data
US 2015/0332644 A1 Nov. 19, 2015

(30) Foreign Application Priority Data
Feb. 26, 2013 (JP) ................................. 2013-035695

(51) Int. Cl.
G09G 3/36 (2006.01)
G02F 1/1345 (2006.01)

(52) U.S. Cl.
CPC ....... *G09G 3/3611* (2013.01); *G02F 1/13452* (2013.01); *G02F 2001/13456* (2013.01);
(Continued)

(58) Field of Classification Search
CPC ......... G09G 3/3611; G09G 2300/0408; G09G 2300/0426; G02F 1/13452; G02F 2001/13456
See application file for complete search history.

(56) References Cited

U.S. PATENT DOCUMENTS

| 7,714,975 B1 | 5/2010 | Yamazaki et al. |
| 2004/0100431 A1* | 5/2004 | Yoshida ................... G09G 3/20 345/82 |

(Continued)

FOREIGN PATENT DOCUMENTS

| JP | 2001-264807 A | 9/2001 |
| JP | 2002-124537 A | 4/2002 |

(Continued)

OTHER PUBLICATIONS

Official Communication issued in International Patent Application No. PCT/JP2014/053252, dated Apr. 28, 2014.

*Primary Examiner* — Kent Chang
*Assistant Examiner* — Andrew Lee
(74) *Attorney, Agent, or Firm* — Keating & Bennett, LLP

(57) ABSTRACT

A liquid crystal display device 10 includes a liquid crystal panel 11, a driver 21, panel-side output terminals 24, image signal lines 30, and control signal lines 31. The driver 21 is configured to generate output signals by processing input signals supplied by a control circuit board 12 and transmit the output signals to a display area AA to drive the display panel 11. The panel-side output terminals 24 are connected to the driver 21. The panel-side output terminals 24 include panel-side image output terminals 24A and panel-side control output terminals 24B disposed along a ling edge 21L of the driver 21. The image signal lines 30 are routed so as to extend from the panel-side image output terminals 24A, to cross a long edge 21L of the driver, and to spread in a fan-like form toward the display area AA. The control signal
(Continued)

lines 31 are routed so as to extend from the panel-side control output terminals 24B toward the display area AA and to cross the short edge 21S of the driver 21.

15 Claims, 19 Drawing Sheets

(52) U.S. Cl.
CPC ............... *G09G 2300/0408* (2013.01); *G09G 2300/0426* (2013.01)

(56) References Cited

U.S. PATENT DOCUMENTS

| | | |
|---|---|---|
| 2007/0146568 A1 | 6/2007 | Yamazaki et al. |
| 2008/0017855 A1 | 1/2008 | Kim et al. |
| 2008/0284697 A1* | 11/2008 | Nam ..................... G02F 1/1345 345/87 |
| 2010/0195013 A1 | 8/2010 | Yamazaki et al. |
| 2011/0074746 A1* | 3/2011 | Chang ..................... G09G 3/20 345/204 |
| 2012/0026138 A1* | 2/2012 | Imai ..................... G09G 3/2096 345/204 |
| 2012/0087460 A1 | 4/2012 | Moriwaki |
| 2012/0146972 A1 | 6/2012 | Fujikawa |
| 2013/0215352 A1 | 8/2013 | Yamazaki et al. |

FOREIGN PATENT DOCUMENTS

| | | |
|---|---|---|
| JP | 2002-131774 A | 5/2002 |
| JP | 2008-026905 A | 2/2008 |
| JP | 2009-053390 A | 3/2009 |
| JP | 2010-243524 A | 10/2010 |
| JP | 2012-073556 A | 4/2012 |
| WO | 2010/147032 A1 | 12/2010 |
| WO | 2011/027589 A1 | 3/2011 |

* cited by examiner

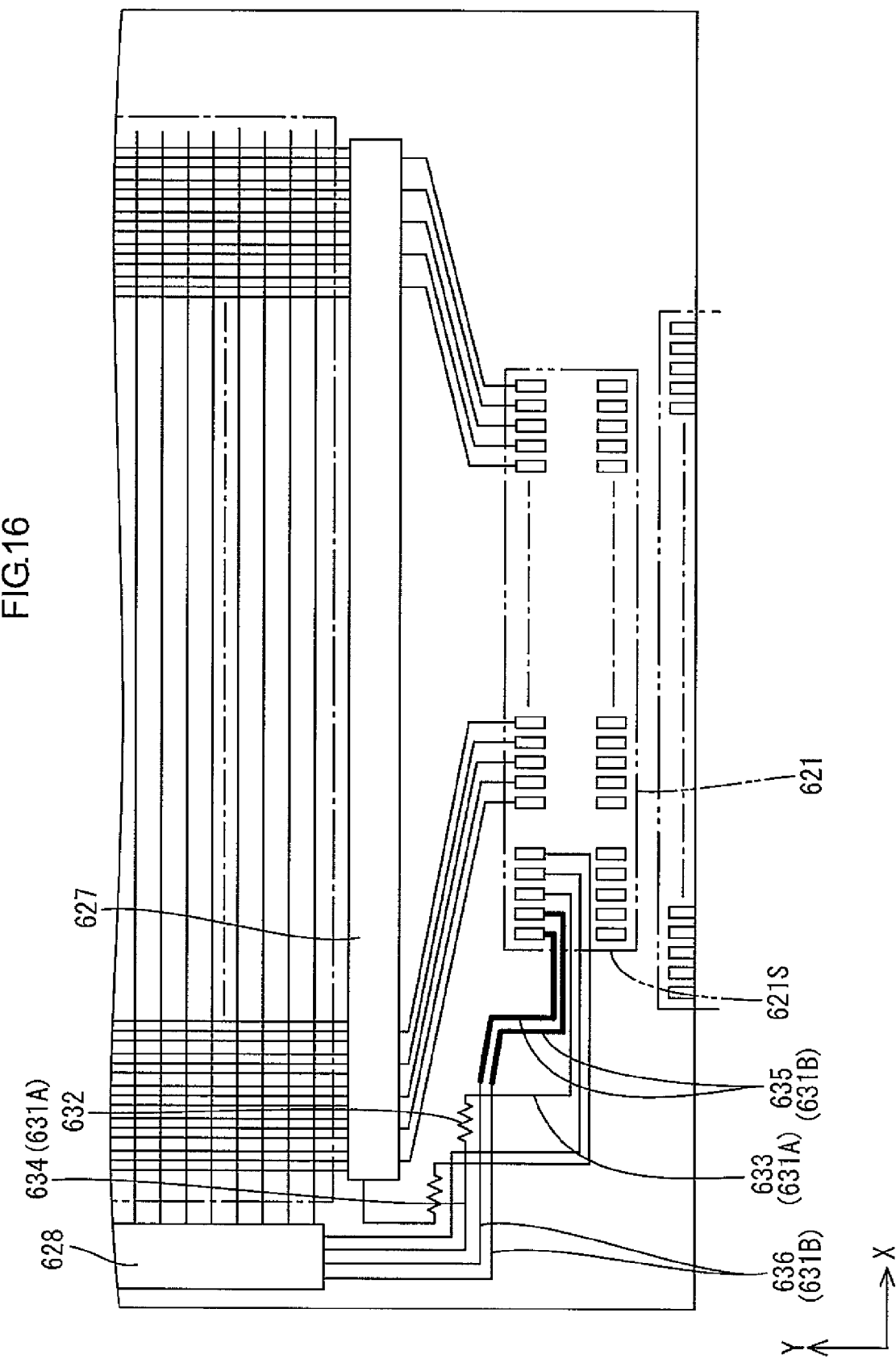

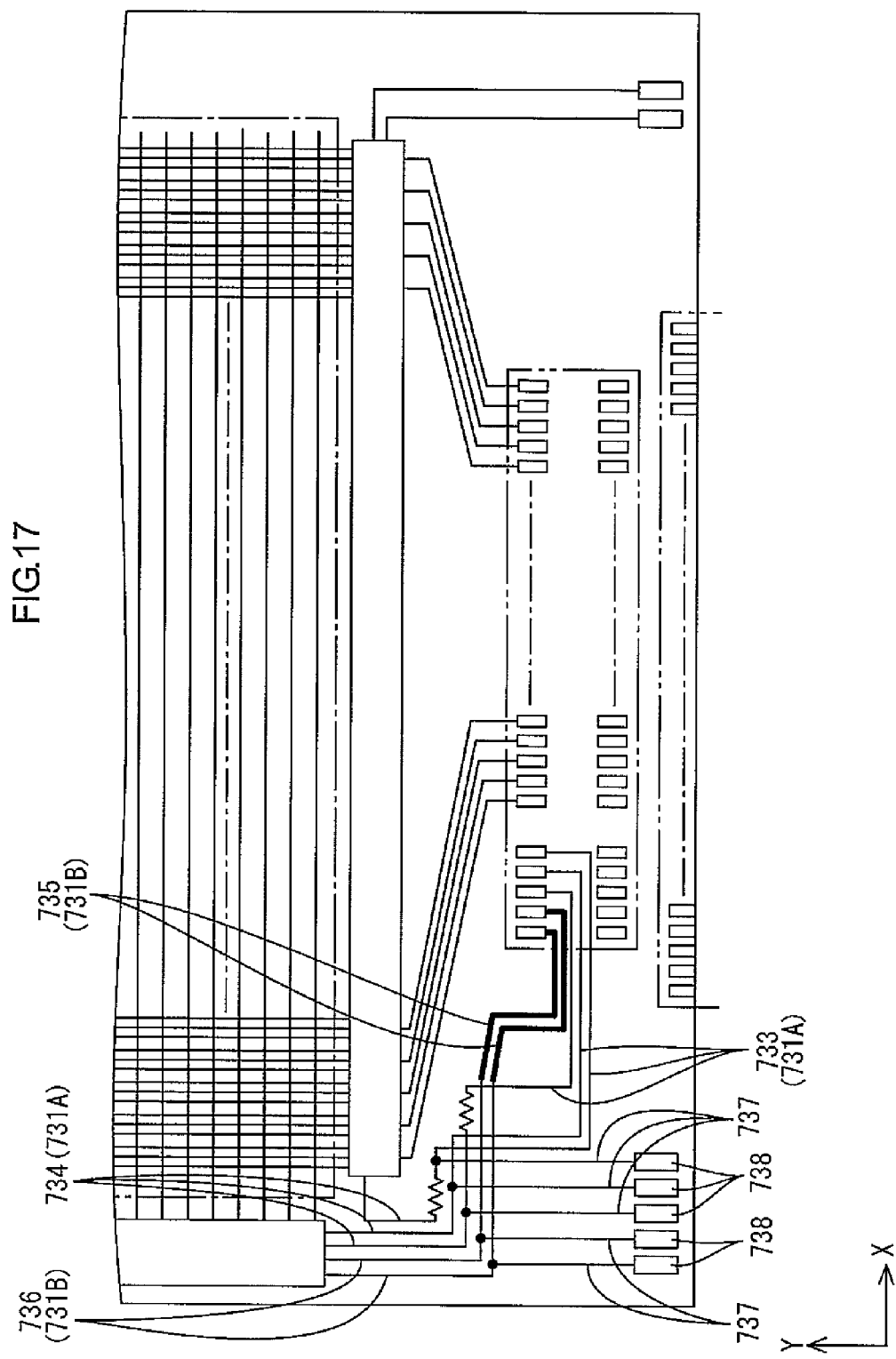

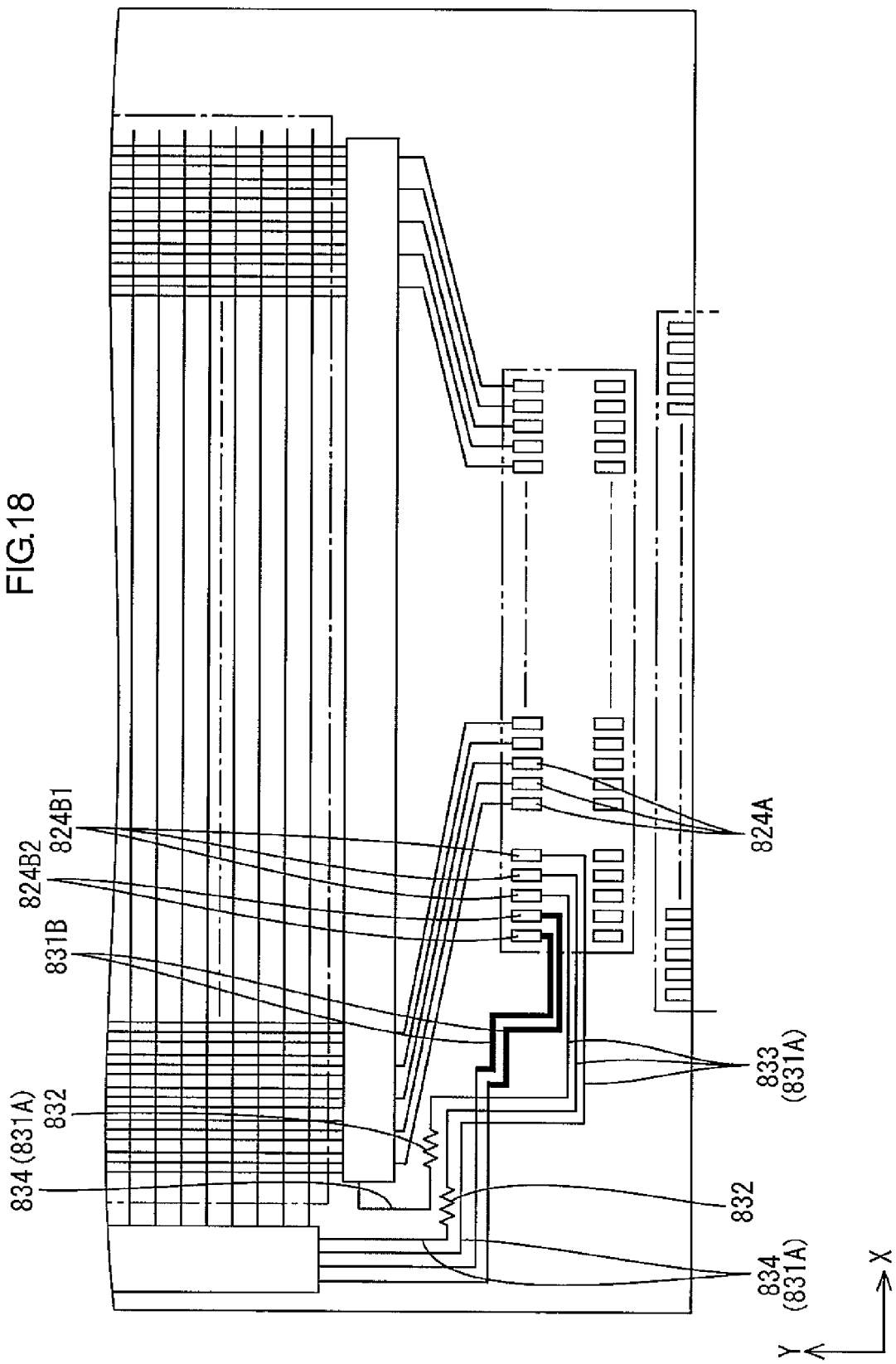

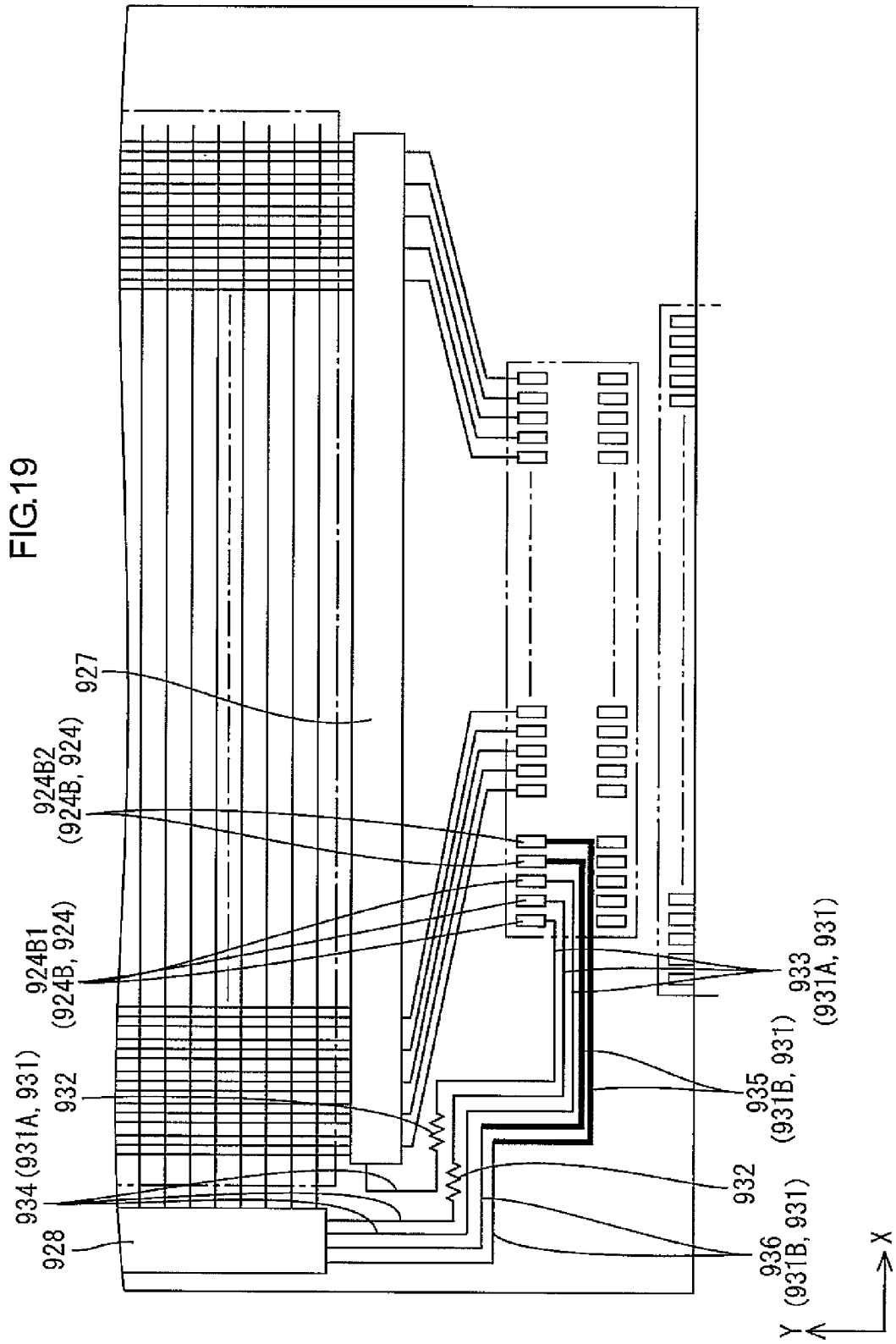

DISPLAY DEVICE

TECHNICAL FIELD

The present invention relates to a display device.

BACKGROUND ART

Personal digital assistants such as mobile phones, smartphones, and tablet computers or electronic devices such as computers include display devices including display panels such as liquid crystal panels. Each of such display devices includes a display panel and a drive. The display panel includes a display area for displaying images. The driver includes an LSI configured to process input signals from a signal source and send generated output signals to the display area for driving the display panel. In general, it is preferable to use a chip on glass (COG) technology to directly mount a driver on a display panel in a non-display area outside a display area in display devices classified as small and medium sized display devices. An example of a display device of this kind is a display device disclosed in Patent Document 1.

RELATED ART DOCUMENT

Patent Document

Patent Document 1: Japanese Unexamined Patent Application Publication No. 2010-243524

Problem to be Solved by the Invention

A display device such as one that is described above includes panel-side output terminals, image signal lines, and control signal lines in a non-display area of a display panel. The panel-side output terminals are connected to an output terminal portion of the driver that is long in the horizontal direction. The image signal lines and the control signal lines are routed from the panel-side output terminals toward the display area in a fan-like form. The panel-side output terminals are provided in a large number corresponding to definition (resolution) of the display area. The panel-side output terminals are arranged parallel to each other along the long-side direction of the driver. The image signal lines and the control signal lines are routed from the panel-side output terminals toward the display area in a fan like form. When the number of the image signal lines is increased to improve the definition of the display area, a distance between the panel-side output terminals and the display area needs to be increased for routing the image signal lines and the control signal lines so as not to cross each other. This increases a size of the non-display area and thus overall sizes of the display panel and the display device increase or a frame area increases.

DISCLOSURE OF THE PRESENT INVENTION

The present invention was made in view of the above circumstances. An object of the present invention is to maintain a non-display area small.

Means for Solving the Problem

A display device according to the present invention includes a display panel, a panel driver, panel-side output terminals, image signal lines, and control signal lines. The display panel includes a display area configured to display images and a non-display area outside the display area. The panel drive is mounted in the non-display area and configured to generate output signals by processing input signals supplied by an external signal source and to transmit the output signals to the display area to drive the display panel. The panel driver has an elongated shape along an edge of the display panel. The panel-side output terminals are disposed in the non-display area and connected to the panel driver. The panel-side output terminals include panel-side image output terminals disposed along a long edge of the panel driver and panel-side control output terminals disposed along the long edge of the panel driver. The image signal lines are for transmitting image signals in the output signals. The image signal lines are routed so as to extend from the panel-side image output terminals, to cross the long edge of the panel driver, and to spread in a fan-like form toward the display area. The control signal lines are for transmitting control signals in the output signals. The control signal lines are disposed in the non-display area and routed so as to extend from the panel-side control output terminals toward the display area and to cross a short edge of the panel driver.

The panel driver mounted in the non-display area of the display panel processes the input signals from the external signal source and generates the output signals. The panel driver outputs the output signals. The penal-side output terminals disposed in the non-display area are connected to the panel driver. Therefore, image signals and control signals in the output signals from the panel driver are transmitted to the display area through the image signal lines and the control signal lines via the panel-side output terminals. With the configuration, the display panel is driven.

The panel-side output terminals include the panel-side image output terminals and the panel-side control output terminals that are disposed along the long edge of the panel driver. In comparison to the configuration in which the panel-side image output terminals are disposed along the long edge of the panel driver and the panel-side control output driver are disposed along the short edge of the panel driver, an increase in size of an area in which the panel-side output terminals are disposed along the short edge of the panel driver is not large. The size of the non-display area along the short edge of the panel driver is maintained small. This configuration is preferable for reducing an overall size and a frame size of the display device.

The control signal lines are routed so as to extend from the panel-side control output terminals toward the display area and to cross the short edge of the panel driver. In comparison to a configuration in which the control signal lines are routed along the image signal lines that extend from the panel-side output terminals, cross the long edge of the panel driver, and spread in a fan-like form toward the display area, an area for routing the control signal lines is not required between the panel-side output terminals and the display area. Therefore, a large area can be provided for the image signal lines that spread in the fan-like form. Even if the number of the image signal lines is increased as definition of the display area is increased, the image signal lines are routed while a distance between the panel-side output terminals and the display area, that is, the non-display area is maintained small. This configuration is more preferable for reducing the overall size and the frame size of the display device.

Preferable embodiments may include the following configurations.

(1) The control signal lines include at last a first control signal line and a second control signal line that includes at least a section having a line width larger than the first control signal line. The control signal lines that cross the short edge of the panel driver include the first control signal line and the second control signal line that includes at least a portion having the line width larger than the first control signal line. In comparison to a configuration in which all the control signal lines are the second control signal lines, a portion of the non-display area in which the control signal lines are disposed is small. This configuration is further preferable for reducing the overall size and the frame size of the display device while reducing line resistance of the second control signal line.

(2) The panel-side control output terminals may include a first panel-side control output terminal and a second panel-side control output terminal. The first control signal line may be connected to the first panel-side control output terminal. The first panel-side control output terminal may be disposed adjacent to one of the panel-side image output terminals located at an outermost. The second control signal line may be connected to the second panel-side control output terminal. The second panel-side control output terminal may be disposed such that the first panel-side control output terminal may be between the one of the panel-side image output terminals located at the outermost and the second panel-side control output terminal. The second control signal line may extend from the second panel-side control output terminal disposed such that the first panel-side control output terminal to which the first control signal line is connected may be between the panel-side image output terminal and the second panel-side control output terminal and crosses the short edge of the panel driver. Therefore, a line length of the second control signal line can be set shorter than a line length of the first control signal line. According to the configuration, the line resistance of the second control signal line is further reduced.

(3) The first control signal line and the second control signal line may include at least first line sections and second line sections. The first line sections may be disposed closer to the panel-side control output terminals. The second line sections may be disposed farther from the panel-side control output terminals including portions overlapping portions of the first line sections. The display device may further include an insulating film disposed between the first line sections and the second line sections. The insulating film may include contact holes in portions overlapping the first line sections and the second line sections for connecting the first line sections to the second line sections. The number of the contact holes for connecting the first line section of the second control signal line to the second line section thereof may be larger than the number of the contact holes for connecting the first line section of the first control signal line to the second line section thereof. The first control signal line and the second control signal line may include at least the first line sections and the second line sections that are connected one another via the contact holes formed in the insulating film. According to the configuration, high flexibility in layout design of the first control signal line and the second control signal line in the non-display area is achieved. The number of the contact holes for connecting the first line section and the second line section of the second control signal line is larger than the number of the contact holes for connecting the first line section and the second line section of the first control signal line. The line resistance of the first line section and the second line section is small. This configuration is preferable for further reducing the line resistance.

(4) The display device may further include switching components disposed in a matrix in the display area and a row control circuit and a column control circuit in the non-display area. The row control circuit may be connected to at least ends of the control signal lines closer to the display area and configured to control supply of the control signals to the switching components. The column control circuit may be connected to at least ends of the image signal lines closer to the display area and configured to control supply of the image signals to the switching components. The supply of the control signals from at least the control signal lines to the switching components disposed in the matrix in the display area may be controlled by the row control circuit. The supply of the image signal from at least the image signal lines to the switching components may be controlled by the column control circuit. According to the configuration, the switching components are properly driven and images are properly displayed in the display area.

(5) The second control signal lines may include at least a clock control signal line and a power supply control signal line. The clock control signal line may be for transmitting clock signals of the control signals. The power supply control signal line may be for transmitting power supply control signals of the control signals for driving the row control circuit and the column control circuit. Among the control signal lines, the clock control signal line may be a kind of lines that is not expected to cause dull edges on a pulse waveform of the clock signals, which are control signals. The power supply control signal line may be a kind of lines that is not expected to cause a voltage drop to stably drive the row control circuit and the column control circuit. With at least portions of the clock control signal line and the power source control signal line having the larger widths, the line resistances thereof can be reduced. As a result, the clock signals having a stable pulse waveform are supplied to the switching components. Furthermore, the row control circuit and the column control circuit are stably driven.

(6) The first control signal lines may include a serpentine portion formed in a serpentine shape. At least one of the row control circuit and the column control circuit may include an electro-static discharge (ESD) protection circuit electrically connected to the first control signal line that includes the serpentine portion. With the serpentine portion, a line resistance of the first control signal line is higher than a control signal line that does not include a serpentine portion. The first control signal line that includes the serpentine portion is electrically connected to at least one of the row control circuit and the column control circuit including the ESD protection circuit. Therefore, even if a surge is input to the first control signal line that includes the serpentine portion due to an electro-static discharge, the surge is passed to the ESD protection circuit. With this configuration, the row control circuit and the column control circuit are protected from the surge.

(7) The switching components, the row control circuit, and the column control circuit may include polycrystalline silicon thin films. In comparison to amorphous silicon thin films, the electron mobility of the polycrystalline silicon thin films is higher. This configuration is preferable for improving definition and reducing power consumption.

(8) The second control signal line may include at least a portion that extends from the panel-side control output terminal and crosses the short edge of the panel driver has a larger line width. The portion of the second control signal line which extends from the panel-side control output terminal and crosses the short edge of the panel driver may be disposed in a portion of the non-display area including larger extra space in comparison to a portion thereof between the panel-side output terminals and the display area. Therefore, the first line section can be widened. According to the configuration, the line resistance of the second control signal line can be reduced while the non-display area is maintained small. In comparison to a configuration in which all control signal lines are the second control signal lines that include the sections crossing the short edge of the driver and widened, the area in which the driver is disposed is reduced in the direction along the short edge.

(9) The display device may include inspection lines disposed in the non-display area. The inspection lines may be connected to the control signal lines for inspection of the control signal lines for continuity. The inspection lines may include a first inspection line connected to the first control signal line and a second inspection line connected to a portion of the second control signal line closer to the display area than the portion having the larger line width. According to the configuration, the first control signal lines and the second control signal lines are inspected for continuity. The section of each second control signal line having the smaller line width closer to the display area than the section having the larger line width is more likely to be broken. The second inspection line is connected to the section of the second control signal line and thus a break is more likely to be detected through the inspection even if the section having the smaller line width has the break. The section of each second control signal line having the larger line width is less likely to break. Without the inspection using the second inspection line, the display device including the broken second control signal line is less likely to be shipped.

(10) The control signal lines may extend from the panel-side control output terminals in a direction opposite to a direction in which the image signal lines may extend from the panel-side image output terminals. In this configuration, the control signal lines are not disposed in the area between the panel-side control output terminals and the display area. Therefore, a larger area is provided between the panel-side output terminals and the display area for the image signal lines that spread in the fan-like form. This configuration is effective when the number of the image signal lines is increased as the definition of the display device is increased.

(11) The panel-side control output terminals may be disposed at an end of the long edge of the panel driver. According to the configuration, sections of the control signal lines extend from the panel-side control output terminals so as to cross the short edge of the panel driver which overlap the panel driver are reduced in length as much as possible. Therefore, mechanical interference between the control signal lines and the penal driver is less likely to occur and circuits in the panel driver are less likely to be subject to noise.

(12) The display panel may further include panel-side input terminals connected to the panel driver and disposed relative to the panel-side output terminals along the short edge of the panel driver in the non-display area. The control signal lines may be routed between the panel-side output terminals and the panel-side input terminals. Input signals from an external signal source are transmitted to the panel driver via the panel-side output terminals. The control signal lines are routed between the panel-side output terminals and the panel-side input terminals that are arranged parallel to each other and along a direction parallel to the short edge of the panel driver. According to the configuration, the control signal lines are routed so as to cross the short edge of the panel driver.

(13) The display panel is a liquid crystal display panel including a pair of substrate and liquid crystals sealed between the substrates. Applications of such a display device include electronic devices including personal digital assistances, mobile phones, notebook computers, and portable video game players.

(14) The display device further includes a lighting device arranged opposite the liquid crystal panel and away from a display surface of the liquid crystal panel. The lighting device is configured to provide the liquid crystal panel with light. Images are displayed in the display area of the liquid crystal panel with the light provided by the lighting device.

Advantageous Effect of the Invention

According to the present invention, the non-display area is maintained small.

BRIEF DESCRIPTION OF THE DRAWINGS

FIG. 16 is a plan view illustrating a configuration of lines at an end of an array board of a liquid crystal panel on which a driver and a flexible circuit board are mounted according to a seventh embodiment of the present invention.

FIG. 17 is a plan view illustrating a configuration of lines at an end of an array board of a liquid crystal panel on which a driver and a flexible circuit board are mounted according to an eighth embodiment of the present invention.

FIG. 18 is a plan view illustrating a configuration of lines at an end of an array board of a liquid crystal panel on which a driver and a flexible circuit board are mounted according to a ninth embodiment of the present invention.

FIG. 19 is a plan view illustrating a configuration of lines at an end of an array board of a liquid crystal panel on which a driver and a flexible circuit board are mounted according to a tenth embodiment of the present invention.

MODE FOR CARRYING OUT THE INVENTION

First Embodiment

Figure 1:
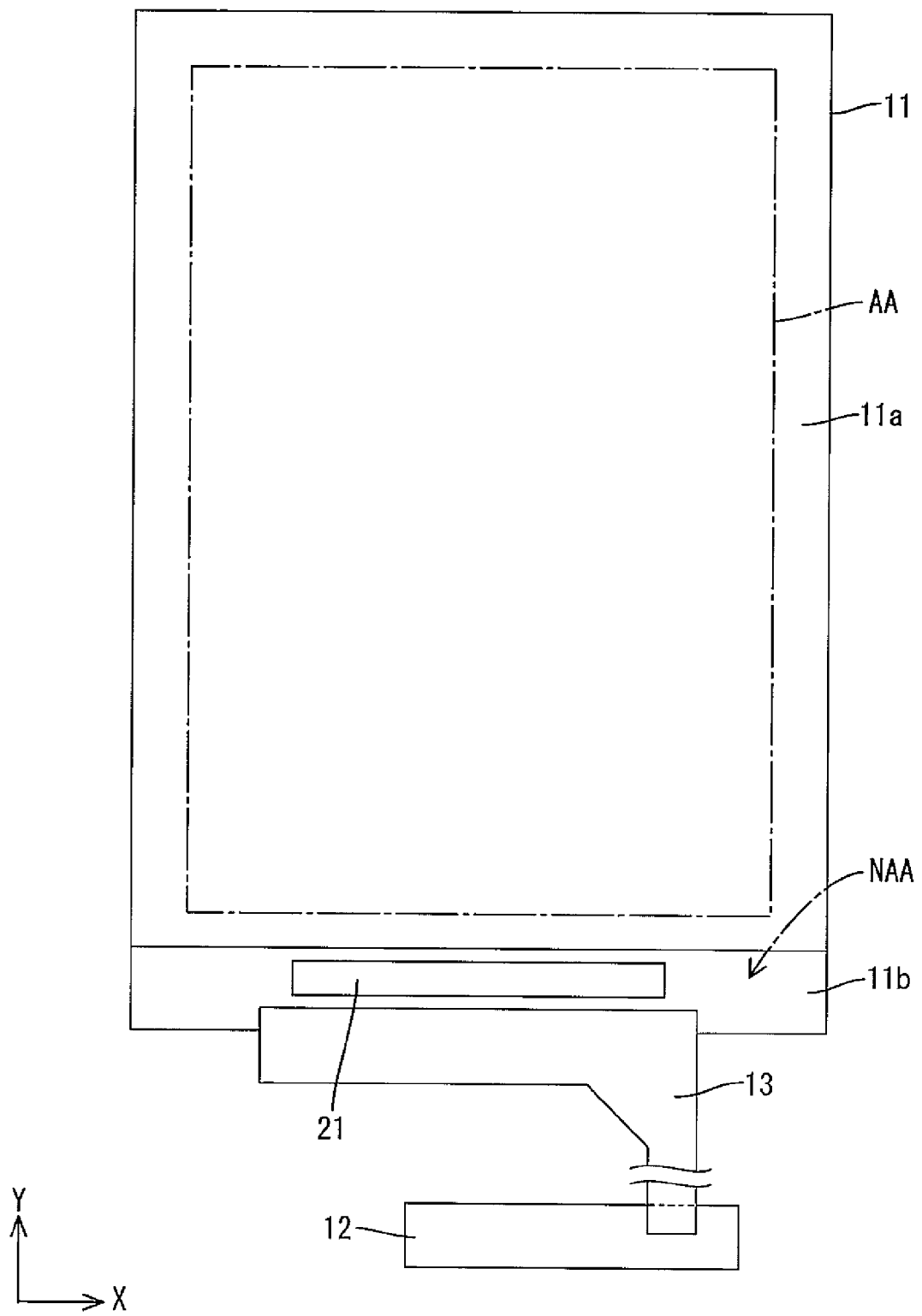
FIG. 1 is a schematic plan view illustrating connection among a flexible circuit board, a control circuit board, and a liquid crystal panel including a driver according to a first embodiment of the present invention.

A first embodiment will be described with reference to FIGS. 1 through 6. A liquid crystal display device 10 according to this embodiment will be described. X-axis, Y-axis and Z-axis are indicated in the drawings. The axes in each drawing correspond to the respective axes in other drawings. The vertical direction in FIG. 2 is defined as a reference. The upper side and the lower side in FIG. 2 correspond to the front side and the rear side, respectively.

Figure 2:
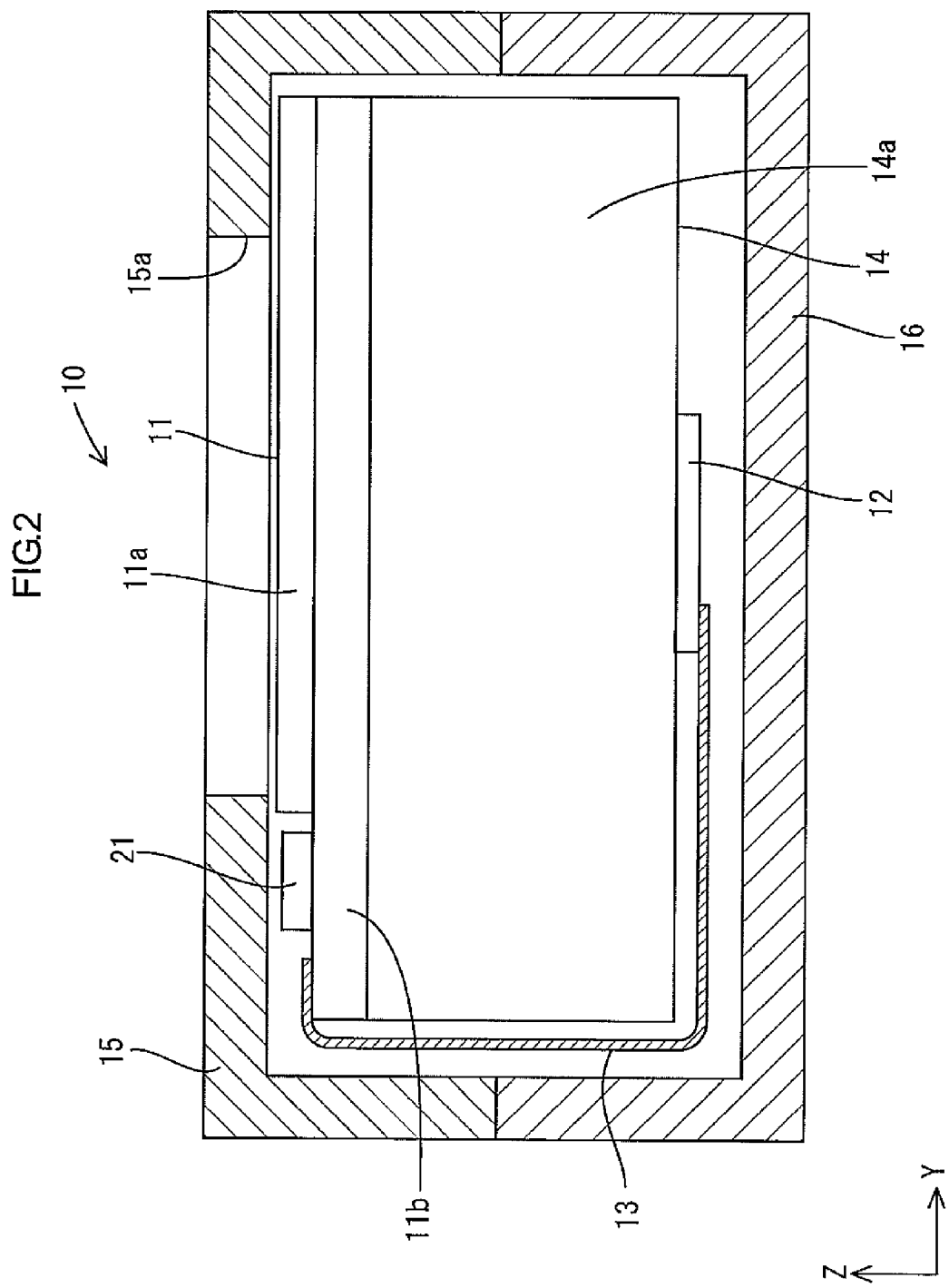
FIG. 2 is a schematic cross-sectional view of a liquid crystal display device along a longitudinal direction.

As illustrated in FIGS. 1 and 2, the liquid crystal display device 10 includes a liquid crystal panel (a display panel, a display component) 11, a driver (a panel driver) 21, a control circuit board (an external signal source) 12, a flexible circuit board (an external device connecting member) 13, and a backlight unit (a lighting unit) 14. The liquid crystal panel 11 includes a display area AA configured to display images and a non-display area NAA outside the display area AA. The driver 21 is configured to drive the liquid crystal display panel 11. The control circuit board 12 is configured to supply various input signals to the driver 21 from the outside. The flexible circuit board 13 electrically connects the liquid crystal panel 11 to the external control circuit board 12. The backlight unit 14 is an external light source configured to provide the liquid crystal panel 11 with light. The liquid crystal display device 10 further includes exterior trim components 15, 16 for covering and holding the liquid crystal panel 11 and the backlight unit 14 that are mounted together. The exterior trim components 15, 16 are a pair of front and rear components. The front exterior trim component 15 includes avoid portion 15a through which images on the display area AA of the liquid crystal panel 11 are viewed from the outside. The liquid crystal display device 10 according to this embodiment is for various electronic devices (not illustrated) including portable information terminals (including electronic book readers and PDAs), mobile phones (including smartphones), notebook computers (including tablet computers), digital photo frames, portable video game players, and electronic papers. The display size of the liquid crystal panel 11 of the liquid crystal display device 10 is from several inches to a dozen inches. Namely, the liquid crystal panel 11 is generally classified as a small sized or a medium sized panel.

First, the backlight unit 14 will be described. As illustrated in FIG. 2, the backlight unit 14 includes a chassis 14a, a light source, which is not illustrated, and an optical member, which are not illustrated. The chassis 14a has a box-like shape with an opening on the front side (the liquid crystal panel 11 side). The light source (e.g., cold cathode ray tubes, LEDs, organic ELs) is arranged inside the chassis 14a. The optical member is arranged so as to cover the opening of the chassis 14a. The optical member has a function for converting light from the light source into planar light.

Next, the liquid crystal panel 11 will be described. As illustrated in FIG. 1, the liquid crystal panel 11 has a vertically elongated (or rectangular) overall shape. The display area (active area) AA is offset toward a first edge of the long dimension of the liquid crystal panel 11 (the upper edge in FIG. 1). The driver 21 and the flexible circuit board 13 are mounted to a portion of the liquid crystal panel 11 closer to a second edge of the ling dimension thereof (the lower edge in FIG. 1). An area of the liquid crystal panel 11 outside the display area AA is the non-display area (non-active area) NAA in which images area not displayed. The non-display area NAA includes a frame-like section around the display area AA (corresponding to a frame area of a CF board 11a, which will be described later) and a section closer to the second edge of the long dimension (an exposed area of the array board 11b not overlapping the CF board 11a). The section closer to the second edge of the long dimension includes a mounting section for the driver 21 and the flexible circuit board 13. The short-side direction of the liquid crystal panel 11 corresponds with the X-axis direction in the drawings. The short-side direction of the liquid crystal panel 11 corresponds with the Y-axis direction in the drawings. In FIG. 1, one-dash chain lines indicate an outline of the display area AA slightly smaller than the CF board 11a. An area outer than a solid line is the non-display area NAA.

Figure 3:
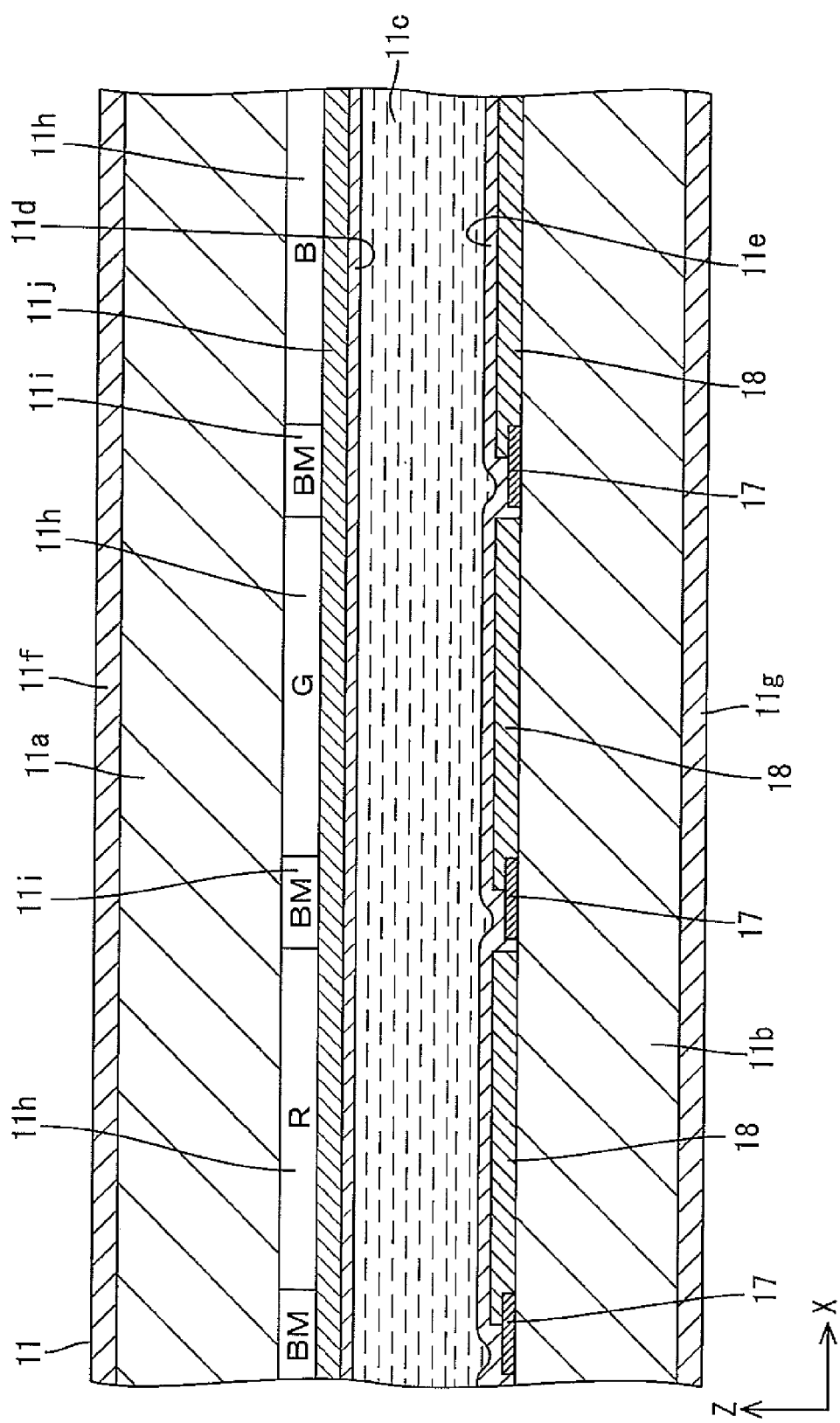
FIG. 3 is a schematic cross-sectional view of the liquid crystal panel.

As illustrated in FIG. 3, the liquid crystal panel 11 includes a pair of transparent (with light transmissivity) glass substrates 11a, 11b and a liquid crystal layer 11c. The liquid crystal layer 11c is between the substrates 11a, 11b. The liquid crystal layer 11c contains liquid crystal molecules, which are substances that change optical characteristics when electromagnetic field is applied. The substrates 11a, 11b are bonded together with a sealant, which is not illustrated, while a gap equal to the thickness of the liquid crystal layer 11c is maintained. One of the substrates 11a, 11b on the front side is the CF board 11a and one on the rear side is the array board 11b. As illustrated in FIGS. 1 and 2, the CF board 11a has a short dimension substantially equal to that of the array board 11b and a long dimension smaller than that of the array board 11b. The CF board 11a is bonded to the array board 11b with a first edge of the long dimension (the upper edge in FIG. 1) aligned with that of the array board 11b. Therefore, the CF board 11a does not overlap a predefined area of the array board 11b closer to a second edge thereof (the lower edge in FIG. 1), that is, front and back surfaces are exposed to the outside. The mounting section for the driver 21 and the flexible circuit board 13 (arrangement section for terminals 22 to 24) is provided in this area. Alignment films 11d, 11e are formed on inner surfaces of the substrates 11a, 11b, respectively. The alignment films 11d, 11e are for aligning the liquid crystal molecules in the liquid crystal layer 11c. Polarizing plates 11f, 11g are attached to outer surfaces of the substrates 11a, 11b, respectively.

Figure 4:
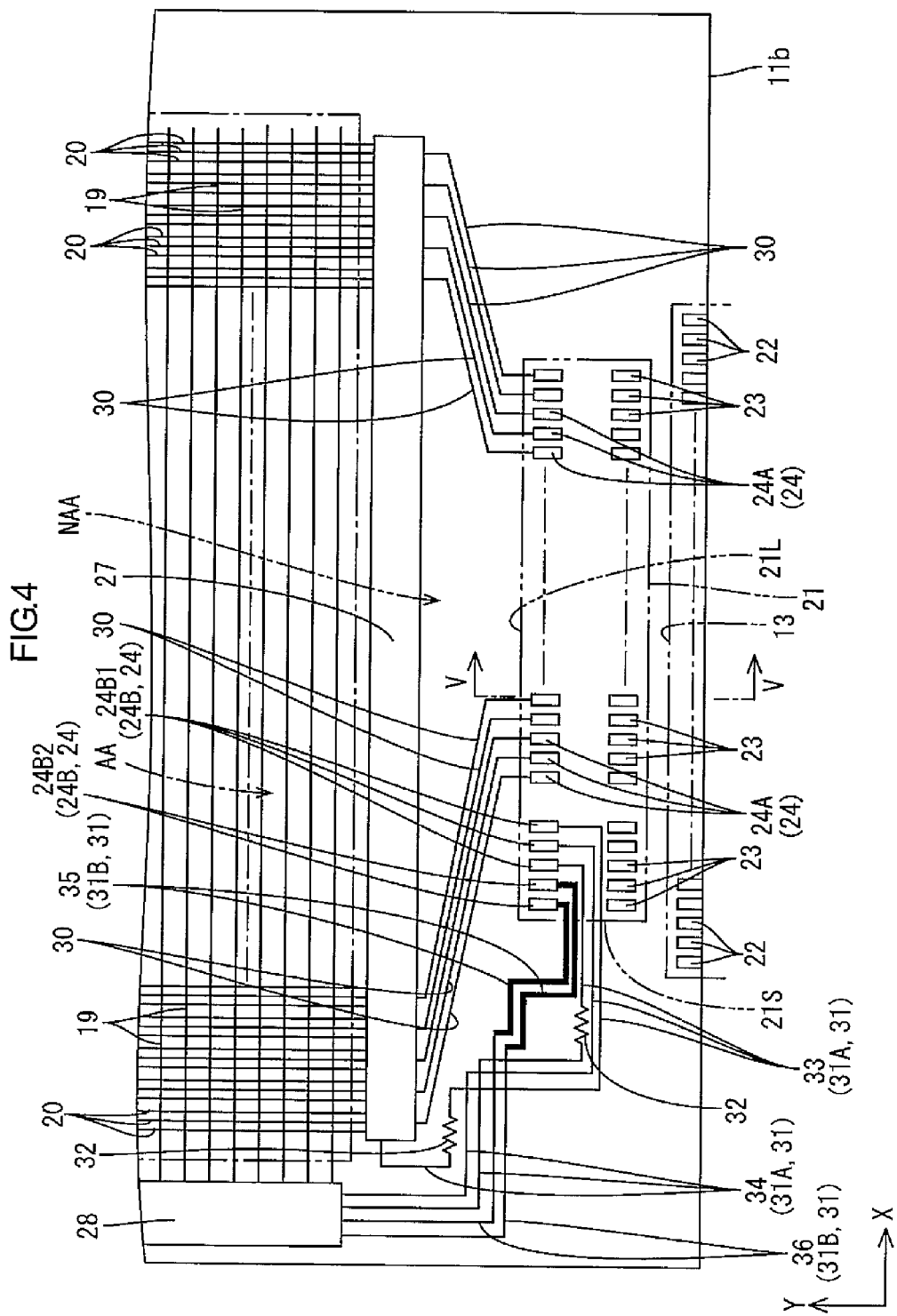
FIG. 4 is a plan view of an end portion of an array board in which the driver and the flexible circuit board are mounted illustrating routing of traces.

Next, configurations of the array board 11b and the CF board 11a inside the display area AA will be described in detail in sequence. As illustrated in FIGS. 3 and 4, a number of thin film transistors (TFTs) 17 and a number of pixel electrodes 18 are arranged in a matrix on the inner surface of the array board 11b (a surface opposite the liquid crystal layer 11C and the CF board 11a). The TFTs 17 are switching components. Gate lines (row control lines, scanning lines) 19 and source lines (column control lines, data lines) are arranged in a matrix around the TFTs 17 and the pixel electrodes 18. Namely, each TFT 17 and each pixel electrodes 18 are arranged at an intersection of corresponding ones of the gate lines 19 and the source lines 20 that are arranged in a matrix. The TFT 17 and the pixel electrodes 18 are arranged in a matrix such that they are parallel to each other. The gate lines 19 and the source lines 20 are made of metal material (conducting material). Insulating films IF (see FIGS. 8 and 9) are arranged between the gate lines 19 and the source lines 20 at intersections thereof. The gate lines 19 and the source lines 20 are connected to gate electrodes and source electrodes of the TFTs 17, respectively. The gate lines 19 and the gate electrodes are formed from the first metal film (the first conductive film) arranged in the lower layer (closer to the glass substrate). The source lines 20, the source electrodes, and the drain electrodes are formed from the second metal film (the second conductive film) arranged in the upper layer than the first metal film and the insulating film IF. The pixel electrodes 18 are connected to drain electrodes. Each TFT 17 includes a semiconductor film that can carry electrons between the source electrode and the drain electrode. The semiconductor film is a continuous grain (CG) silicon thin film, which is a kind of polycrystalline silicon thin films. The CG silicon thin film is prepared by adding a metal material to an amorphous silicon thin film and thermally processing it at a low temperature lower equal to 550° C. or lower for a short period. Therefore, atomic arrangement of silicon crystals at a crystal grain boundary has continuity. Electron mobility of the CG silicon thin film is about 200 to 300 cm$^2$, which is higher than the amorphous silicon thin film. Therefore, the TFT 17 can be easily reduced in size and an amount of transmitting light of the pixel electrode 18 can be maximized. This configuration is preferable for improving the definition and reducing power consumption. In the TFT 17 including such a semiconductor film, the semiconductor film is arranged at the bottom layer and the gate electrode is layered, that is, in an upper layer via an insulating film. Namely, the TFT 17 is a staggered type (a coplanar-type). The pixel electrode 18 has a portrait shape (a rectangular shape) in a plan view. The pixel electrode 18 is made of transparent electrode material such as indium tin oxide (ITO) and zinc oxide (ZnO). Capacitance lines may be arranged on the array board 11b parallel to the gate lines 19, crossing the pixel electrodes 18, and overlapping via an insulating film (not illustrated).

As illustrated in FIG. 3, a number of color filters 11h including color sections such as red (R), green (G), and blue (B) color sections are arranged in a matrix on the CF board 11a. The color filters 11h are arranged parallel to each other so as to overlap the pixel electrodes 18 on the array board 11b in a plan view. A light blocking layer (a black matrix) 11i is formed in spaces between the color sections of the color filters 11h. The light blocking layer has a grid-like shape and has a function for reducing color mixing. The light blocking layer 11i is disposed over the gate lines 19 and the source lines 20 in a plan view. Counter electrodes 11j are formed on surfaces of the color filters 11h and the light blocking layer 11i. The counter electrodes 11j are solid traces opposite the pixel electrodes 18 on the array board 11b. In the liquid crystal panel 11, the R (red), the G (green), and the B (blue) color sections and three pixel electrodes 18 opposite those color sections form one pixel, which is a unit of display. The pixel includes a red pixel including the R color section, a green pixel including the G color section, and a blue pixel including the B color section. The color pixels are arranged on a plate surface of the liquid crystal panel 11 in repeating sequence along the rows (the X-axis direction). This forms a number of groups of pixels arranged along the columns (the Y-axis direction).

As illustrated in FIGS. 1 and 2, the control circuit board 12 is mounted to the rear surface (an outer surface on an opposite side from the liquid crystal panel 11) of the chassis 14a of the backlight unit 14 with screws. The control circuit board 12 includes electronic components for providing the driver 21 with various input signals. The electronic components are mounted on a phenolic paper or a glass-epoxy resin substrate on which traces (electrically-conducting paths) are formed in predetermined patterns (not illustrated). A first end (one of ends) of the flexible printed circuit board 13 is electrically and mechanically connected to the control circuit board 12 via an anisotropic conductive film (ACF).

As illustrated in FIG. 2, the flexible circuit board (an FPC board) 13 includes a base member made of synthetic resin (e.g., polyimide resin) having insulating properties and flexibility. A number of traces are formed on the base member (not illustrated). The first end of the long dimension of the flexible circuit board 13 is connected to the control circuit board 12 disposed on the rear surface of the chassis 14a as described earlier. A second end (another end) is connected to the array board 11b of the liquid crystal panel 11. In the liquid crystal display device 10, the flexible circuit board 13 is folded in U-like shape in a cross-sectional view. At ends of the long dimension of the flexible circuit board 13, the traces are exposed to the outside to form terminal portions (not illustrated). The terminal portions are electrically connected to the control circuit board 12 and the array board 11b, respectively. With this configuration, the input signals are transmitted from the control circuit board 12 to the liquid crystal panel 11.

As illustrated in FIG. 1, the driver 21 is an LSI chip including a driver circuit therein. The driver 21 is configured to operate based on signals from the control circuit board 12, which is a signal source, to generate output signals from the input signals from the control circuit board 12, and to send the output signals to the display area AA of the liquid crystal panel 11. The driver 21 has a landscape rectangular shape in a plan view (a longitudinal shape along the short edge of the liquid crystal panel 11). The driver 21 is directly mounted on the array board 11b of the liquid crystal panel 11 in the non-display area NAA, that is, through a chip on glass (COG) mount method. The long-side direction of the driver 21 corresponds with the X-axis direction (the short-side direction of the liquid crystal panel 11) and the short-side direction thereof corresponds with the Y-axis direction (the long-side direction of the liquid crystal panel 11).

Next, a connecting structure of the flexible circuit board 13 and the driver 21 in the non-display area NAA of the array board 11b will be described. The non-display area NAA of the array board 11b includes a non-overlapping area that does not overlap the CF board 11a. In the non-overlapping area, the flexible circuit board 13 and the driver 21 are mounted as illustrated in FIG. 1. An end of the flexible circuit board 13 is arranged at a short edge portion of the array board 11b (along the X-axis direction) and the driver 21 is arranged closer to the display area AA than the flexible circuit board 13 on the array board 11b. Namely, the driver 21 is arranged between the display area AA and the flexible circuit board 13 in the non-display area NAA and the flexible circuit board 13 is arranged such that the end thereof (the portion mounted to the liquid crystal panel 11) is farther from the display area AA than the driver 21. The flexible circuit board 13 are the driver 21 arranged in the non-display area NAA of the array board 11b with a gap between the flexible circuit board 13 and the driver 21 and a gap between the driver 21 and the display area AA in the long-side direction of the array board 11b (a short-side direction of the driver 21, the Y-axis direction). The end of the flexible circuit board 13 is mounted at the middle of the short dimension of the array board 11b such that an edge of the mounted end extends along the short side of the array board 11b (along the short-side direction or the X-axis direction). The length of the edge of the flexible circuit board 13 mounted to the array board 11b is smaller than the length of the array board 11b. The driver 21 is mounted at the middle of the short dimension of the array board 11b in the non-display area NAA with the long-side direction thereof aligned with the short-side direction of the array board 11b (the X-axis direction). The driver 21 is arranged such that the midpoint thereof in the short-side direction of the array board 11b is at about the same position as the midpoint of the flexible circuit board 13. The long dimension of the driver is smaller than the length of the edge of the flexible circuit board 13 mounted to the array board 11b.

As illustrated in FIG. 4, in the mounting area of the array board 11b in which the flexible circuit board 13 is mounted (an external component mounting area), external connection terminals 22 are arranged for receiving input signals from the flexible circuit board 13. In the mounting area of the array board 11b in which the driver 21 is mounted (a panel driver mounting area, a panel driver arrangement area), panel-side input terminals and panel-side output terminals 24 are arranged. The panel-side input terminals 23 are for inputting input signals to the driver 21 and the panel-side output terminals 24 are for receiving output signals from the driver 21. In the non-display area NAA, relay traces are routed (not illustrated) so as to cross a space between the mounting area in which the flexible circuit board 13 is mounted and the mounting area in which the driver 21 is mounted. The external connection terminals 22 and the panel-side input terminals 23 are electrically connected via the relay traces. The driver 21 includes driver-side input terminals (a panel-driving-side input terminal) 25 and driver-side output terminals (a panel-driving-side output terminal) 26. The driver-side input terminals 25 are electrically connected to the panel-side input terminals 23. The driver-side output terminals 26 are electrically connected to the panel-side output terminals 24. In FIG. 4, the flexible circuit board 13 and the driver 21 are indicated by two-dashed chain lines. In FIG. 4, one-dashed chain lines indicate the outer boundary of the display area AA inside a column control circuit 27 and a row control circuit 28, which will be described later. The area outside one-dashed chain lines is the non-display area NAA.

Figure 5:
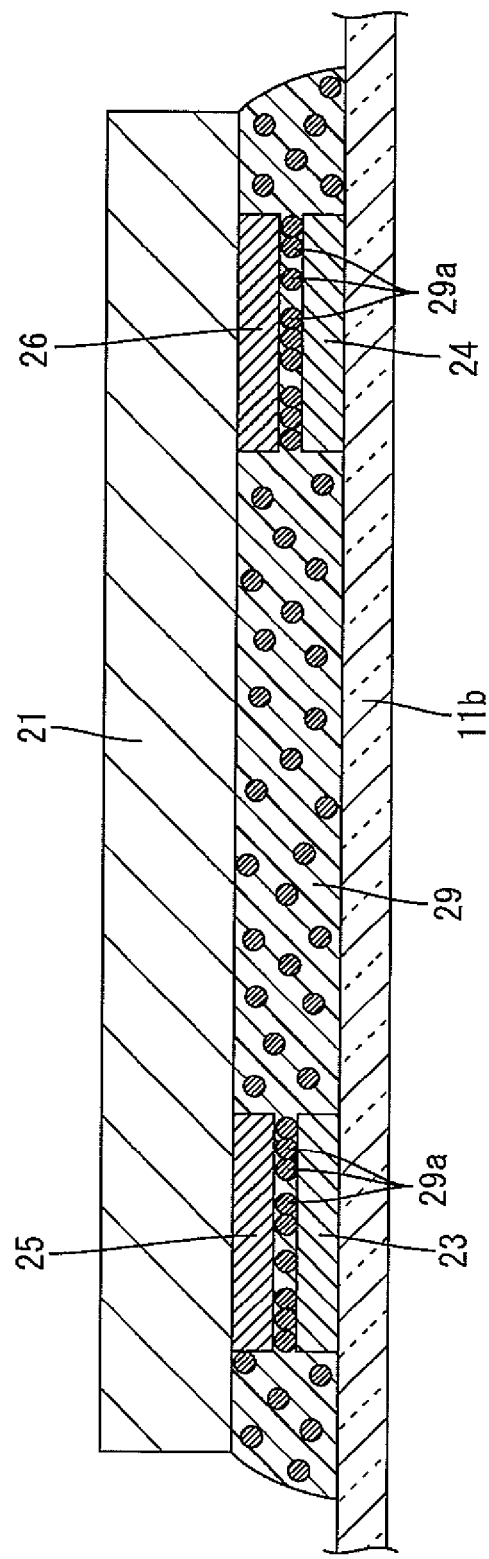
FIG. 5 is a cross-sectional view of FIG. 4 along line v-v.

The panel-side input terminals 23 and the panel-side output terminals 24 include thin films that are formed from the first metal film that is the same as the gate lines 19. As illustrated in FIG. 5, the surfaces are covered with transparent electrode material that is the same as that of the pixel electrodes 18 such as ITO and ZnO. In the production process of the liquid crystal panel 11 (the array board 11b), patterning of the panel-side input terminals 23 and the panel-side output terminals 24 is performed during patterning of the gate lines 19 or the pixel electrodes 18 using a known photolithography method. Anisotropic conductive films (ACF) 29 are applied to the surfaces of the panel-side input terminals 23 and the panel-side output terminals 24. The driver-side input terminals 25 and the driver-side output terminals 26 of the driver 21 are electrically connected to the panel-side input terminals 23 and the panel-side output terminals 24, respectively, via conducting particles 29a contained in the anisotropic conductive films 29. Although not illustrated in the drawings, the external connection terminals 22 have a cross-sectional structure including the first metal film and the transparent electrode film, which is similar to the cross-sectional structure of the panel-side input terminals 23 and the panel-side output terminals 24. The external connection terminals 22 are electrically connected to the terminal portion of the flexible circuit board 13 via the anisotropic conductive film.

As illustrated in FIG. 4, the panel-side input terminals 23 and the panel-side output terminals 24 are arranged in a portion of the non-display area NAA of the array board 11b where the driver 12 overlaps in a plan view, that is, the mounting area of the array board 11b. The panel-side input terminals 23 and the panel-side output terminals 24 are arranged along the Y-axis direction (an arrangement direction in which the driver 21 and the display area AA are arranged, the short-side direction of the driver 21) with a predetermined gap therebetween. The panel-side input terminals 23 are arranged closer to the flexible circuit board 13 (away from the display area AA) in the mounting area of the driver 21 of the array board 11b. The panel-side output terminals 24 area arranged closer to the display area AA (away from the flexible circuit board 13). Groups of the panel-side input terminals 23 and the panel-side output terminals 24 are linearly arranged at predetermined intervals along the X-axis direction, that is, the long-side direction of the driver 21 (a direction perpendicular to the direction in which the driver 21 and the display area AA are arranged).

As illustrated in FIG. 4, the panel-side output terminals 24 include panel-side image output terminals 24A and the panel-side control output terminals 24B. The panel-side output terminals 24 are for receiving image signals (data signals, video signals) in output signals from the driver 21. The panel-side control output terminals 24B are for receiving control signals in the output signals. A plurality of the panel-side image output terminals 24A in the panel-side output terminals 24 are arranged from the right edge (one of the edges) toward left in FIG. 4 along the X-axis direction so as to be apart from each other. The panel-side image output terminals 24A account for a large part (a large number) of the panel-side output terminals 24. Five panel-side control output terminals 24B are arranged from the left edge (the other one of the edges) toward right in FIG. 4 along the X-axis direction so as to be apart from each other. The panel-side control output terminals 24B account for only a part (a small number) of the panel-side output terminals 24. Namely, five panel-side control output terminals 24B are arranged closer to the other end of the long edge of the driver 21 (the end closer to the row control circuit 28). The panel-side image output terminals 24A and the panel-side control output terminals 24B are arranged at about the same Y-axis position and linearly along the X-axis direction. In comparison to a configuration in which the panel-side image output terminals are arranged along the X-axis direction and the panel-side control output terminals are arranged along the Y-axis direction, the area for the panel-side output terminals 24 is less likely to increase in the Y-axis direction (the direction along the short edge of the driver 21). According to the configuration, the non-display area NAA is maintained small in the Y-axis direction. This configuration is preferable for reducing the overall size and the frame size of the liquid crystal display device 10 (or the liquid crystal panel 11). In the following description, the panel-side image output terminals of the panel-side output terminals 24 will be indicated by the reference numeral with the suffix A and the panel-side control output terminals will be indicated by the reference numeral with the suffix B when they need to be distinguished from each other. When the panel-side image output terminals and the panel-side control output terminals do not need to be distinguished from each other, the suffixes will not be added.

The driver-side input terminals 25 and the driver-side output terminals 26 are made of metal having high conductivity such as gold. As illustrated in FIG. 5, each of the driver-side input terminals 25 and the driver-side output terminals 26 has a bump-like shape that protrudes from the bottom surface of the driver 21 (the surface opposite the array board 11b). The driver-side input terminals 25 and the driver-side output terminals 26 are connected to a processing circuit in the driver 21. Input signals from the driver-side input terminals 25 are processed by the processing circuit and the processed signals are output from the driver-side output terminals 26. The driver-side input terminals 25 and the driver-side output terminals 26 are arranged along the X-axis direction similar to the panel-side input terminals 23 and the panel-side output terminals 24. Namely, groups of the driver-side input terminals 25 and the driver-side output terminals 26 are linearly arranged at predetermined intervals along the long-side direction of the driver 21.

As illustrated in FIG. 4, in portions of the non-display area NAA of the array board 11b adjacent to the short side and the long side of the display area AA, respectively, the column control circuit 27 and the row control circuit 28 are disposed. The column control circuit 27 and the row control circuit 28 are connected to the gate lines 19 and the source lines 20 for transmitting output signals from the driver 21 to the TFTs 17. Each of the column control circuit 27 and the row control circuit 28 includes a control circuit for controlling transmission of the output signals to the TFTs 17. The control circuit is monolithically fabricated on the array board 11b with a CG silicon thin film, which is also used in TFTs 17, as a base. In the production process of the liquid crystal panel 11 (the array board 11b), patterning of the column control circuit 27 and the row control circuit 28 is performed on the array board 11b during patterning of the gate lines 19, the source lines 20, the insulating films, the gate electrodes, the source electrodes, and the drain electrodes of the TFTs 17, and the semiconductor film using a known photolithography method.

As illustrated in FIG. 4, the column control circuit 27 is arranged adjacent to the short side of the display area AA on the lower side in FIG. 4. Namely, the column control circuit 27 is arranged in a landscape rectangular area that extends in the X-axis direction between the display area AA and the driver 21 with respect to the Y-axis direction. The column control circuit 27 has a long dimension about equal to the short dimension of the display area AA. The column control circuit 27 is connected to the source lines 20 arranged in the display area AA. The column control circuit 27 includes a switch circuit (an RGB switch circuit) for distributing the image signals in the output signals from the driver to the source lines 20, respectively.

Specifically, multiple numbers of the source lines 20 are arranged parallel to each other in the X-axis direction in the display area AA of the array board 11b and connected to the respective TFTs 17 configured as R (red), G (green), and B (blue) pixels. The column control circuit 27 distributes the image signals from the driver 21 to the R, G, and B source lines 20 using the switch circuit. The column control circuit 27 includes auxiliary circuits including a level shifter circuit and an electro-static discharge (ESD) protection circuit.

As illustrated in FIG. 4, the row control circuit 28 is arranged adjacent to the long edge of the display area AA on the left side in FIG. 4. Namely, the row control circuit 28 is arranged in a portrait rectangular area that extends in the Y-axis direction. The long dimension of the row control circuit 28 is about equal to the long dimension of the display area AA. The row control circuit 28 is connected to the gate lines 19 arrange in the display area AA. The row control circuit 28 includes a scan circuit for sending control signals in the output signals from the driver 21 to the gate lines 19 at predetermined timing and scanning the gate lines 19 in sequence. Specifically, multiple numbers of the gate lines 19 are arranged parallel to each other in the Y-axis direction in the display area AA of the array board 11b. The scan circuit of the row control circuit 28 is configured to send control signals (scan signals) from the driver 21 to the gate lines 19 in sequence from the uppermost one in FIG. 4 (or FIG. 1) to the lowermost one to scan the gate lines 19. The row control circuit 28 includes auxiliary circuits including a level shifter circuit, a buffer circuit, and an ESD protection circuit.

As illustrated in FIG. 4, in the non-display area NAA of the array board 11b, image signal lines 30 and control signal lines 31 are arranged. The image signal lines 30 connect the panel-side image output terminals 24A, which are connected to the driver 21, to the column control circuit 27 to transmit image signals. The control signal lines 31 connect the panel-side control output terminals 24B, which are connected to the driver 21, to the row control circuit 28 to transmit control signals. The image signal lines 30 and the control signal lines 31 are formed from the first metal film that also forms the gate lines 19 and the second metal film that also forms the source lines 20, respectively. In the production process of the liquid crystal panel 11 (the array board 11b), patterning of the image signal lines 30 and the control signal lines 31 is performed on the array board 11b during patterning of the gate lines 19 and the source lines 20 using a known photolithography method.

As illustrated in FIG. 4, one of ends of each image signal line 30 (closer to the display area AA) is connected to the long edge of the column control circuit 27 along the X-axis direction. The other end of each image signal line 30 (away from the display area AA) is connected to the corresponding panel-side image output terminal 24A. The image signal lines 30 are routed so as to cross an area between the column control circuit 27 and the panel-side image output terminals 24A in the non-display area NAA of the array board 11b. A number of the image signal lines 30 are arranged in the X-axis direction and connected to the respective panel-side image output terminals 24A that are arranged in the X-axis direction. An X-dimension of an area in which the column control circuit 27, to which the image signal lines 30 are connected, is larger than that of an area in which the panel-side image output terminals 24A are disposed when they are compared. This is because the number of the source lines 20 connected to the column control circuit 27 is larger than the number of the image signal lines 30 (about three times larger). One of ends of each image signal line 30 closer to the panel-side image output terminals 24A is located at the middle of the array board 11b with respect to the X-axis direction. The other end closer to the column control circuit 27 is located closer to the edge of the array board 11b with respect to the X-axis direction. The image signal lines 30 connected to the panel-side image output terminals 24A spread in a fan-like form when they are routed from the panel-side image output terminals 24A to the column control circuit 27. Specifically, the image signal lines 30 are routed from the panel-side image output terminals 24A in the Y-axis direction, that is, the short-side direction of the driver 21 toward the column control circuit 27 (toward the display area AA). The image signal lines 30 are bent at an angle relative to the X-axis direction and the Y-axis direction and spread outward in the X-axis direction (the long-side direction of the driver 21). The image signal lines 30 are routed to the long edge of the column control circuit 27. Namely, the image signal lines 30 are routed from the panel-side image output terminals 24A to the column control circuit 27 (or the display area AA) so as to cross the long edge 21L of the driver 21 and spread in a fan-like form while bending at some points. The image signal lines 30 are routed so as to become closer to the edge of the array board 11b (or farther from the middle) with respect to the X-axis direction as distances from the respective panel-side image output terminals 24A in the Y-axis direction become larger and distances from the column control circuit 27 (or the display area AA) in the Y-axis direction become smaller while bending at some points. The image signal lines 30 on the left in FIG. 4 among the image signal lines 30 are angled in the counterclockwise direction and the image signal lines 30 on the right in FIG. 4 are angled in the opposite direction, that is, in the clockwise direction.

As illustrated in FIG. 4, one of the control signal lines 31 includes one of ends (closer to the display area AA) connected to the short edge of the column control circuit 27 along the Y-axis direction adjacent to the row control circuit 28 and the other end (away from the display area AA) connected to the panel-side control output terminal 24B. Four of the control signal lines 31 each includes one of ends connected to the short edge of the row control circuit 28 along the X-axis direction closer to the column control circuit 27 and the other end connected to the panel-side control output terminal 24B. The control signals transmitted by the control signal line 31 including the end connected to the column control circuit 27 include driving voltage signals for driving the column control circuit 27. The control signals transmitted by the control signals lines 31 including the ends connected to the row control circuit 28 include scan signals, clock signals, power supply voltage signals, initial signals, start pulses, scanning-direction switching signals, and driving signals for driving the row control circuit 28.

As illustrated in FIG. 4, five control signal lines 31 are routed from the respective panel-side control output terminals 24B toward the display area AA while crossing the short edge 21S of the driver 21. Each control signal line 31 extends from the corresponding panel-side control output terminal 24B along the Y-axis direction, that is, the short-side direction of the driver 21 in a direction opposite to the column control circuit 27 (or the display area AA). The control signal line 31 bends at a substantially right angle at a point before the corresponding panel-side input terminal 23 and extends across the short edge 21S of the driver 21 to the outside of the driver 21 mounting area. Outside the driver 21 mounting area, the control signal line 21 bends several times and reaches the column control circuit 27 or the row control circuit 28. The direction in which the control signal line 31 extends from the panel-side control output terminal 24B is about 180 degrees different from the direction in which the image signal line 30 extends from the panel-side image output terminal 24A. The control signal line 31 extends so as to cross the short edge 21S of the driver 21 between the panel-side control output terminal 24B and the panel-side input terminal 23 within the driver 21 mounting area. The control signal line 31 is not arranged in the portion of the non-display area NAA of the array board 11b between the driver 21 and the column control circuit 27 (or the display area AA) in which the image signal lines 30 described earlier. Namely, it is not necessary to provide a portion for routing the control signal lines 31 between the driver 21 and the column control circuit 27 (or the display area AA) in the non-display area NAA of the array board 11b. In comparison to a configuration in which the control signal lines are arranged in a fan-like form similar to the image signal lines 30, a larger area is provided in the portion of the non-display area NAA of the array board 11b between the driver 21 and the column control circuit 27 (or the display area AA) for routing the image signal lines 30. Even if the number of the image signal lines 30 increases as the definition of the display area AA increases, the image signal lines 30 are routed while the distance between the driver 21 and the column control circuit 27 (or the display area AA), that is, the non-display area NAA is maintained small. This configuration is preferable for reducing an overall size or the frame size of the liquid crystal display device 10 (or the liquid crystal panel 11).

As illustrated in FIG. 4, some of five control signal lines 31 are first control signal lines 31A and other control signal lines 31 are second control signal lines 31B. Each second control signal line 31B includes a portion, a width of which is larger than that of the first control signal line 31A. In comparison to a configuration in which all control lines are the second control signal lines, the portion of the non-display area NAA in which the control signal lines 31 are arranged is small. If each first control signal line 31A and each second control signal line 31B have the same length, the second control signal line 31B has a line resistance lower than the first control signal line 31A. This configuration is further preferable for reducing the overall size or the frame size of the liquid crystal display device 10 while the line resistances of the second control signal lines 31B are maintained low. In the following description, the first control signal lines of the control signal lines 31 will be indicated by the reference numeral with the suffix A and the second control signal lines will be indicated by the reference numeral with the suffix B when they need to be distinguished from each other. When the first control signal lines and the second control signal lines do not need to be distinguished from each other, the suffixes will not be added. Furthermore, in the following description, the panel-side control output terminals 24B to which the first control signal lines 31A are connected among the panel-side control output terminals 24B are indicated as the first panel-side control output terminals 24B1. The panel-side control output terminals 24B to which the second control signal lines 31B are connected are indicated as the second panel-side control output terminals 24B2. When the first panel-side control output terminals and the second panel-side control output terminals are distinguished from each other, the first panel-side control output terminals will be indicated by the reference numeral with the suffix "1" and the second panel-side control output terminals will be indicated by the reference numeral with the suffix "2." When the first panel-side control output terminals and the second panel-side control output terminals do not need to be distinguished from each other, the suffixes will not be added.

As illustrated in FIG. 4, the first panel-side control output terminals 24B1 connected to the first control signal lines 31A are arranged adjacent to the panel-side image output terminals 24A among the panel-side output terminals 24. Namely, the first panel-side control output terminals 24B1 include one that is adjacent to the leftmost one of the panel-side image output terminals 24A in FIG. 4. Three first control signal lines 31A and three first panel-side control output terminals 24B1 are arranged in the X-axis direction. A width of each first control signal line 31A is substantially constant for an entire length thereof. The first control signal lines 31A extend from the respective first panel-side control output terminals 24B1 along the Y-axis direction to the side opposite from the column control circuit 27 (or the display area AA). Each first control signal lines 31A bends at about right angle at a point closer to the panel-side input terminal 23 than a point at which the second control signal line 31B bends. The first control signal lines 31A extend along the X-axis direction so as to cross the short edge 21S of the driver 21 and to the outside of the driver 21 mounting area. Each first control signal line 31 outside the driver 21 mounting area bends at about right angle at a predefined point and extends along the Y-axis direction toward the column control circuit 27 (or the display area AA). The first signal line 31 bends at about right angle at a point before the column control circuit 27 and extends outward along the X-axis direction, that is, toward the row control circuit 28.

Figure 6:
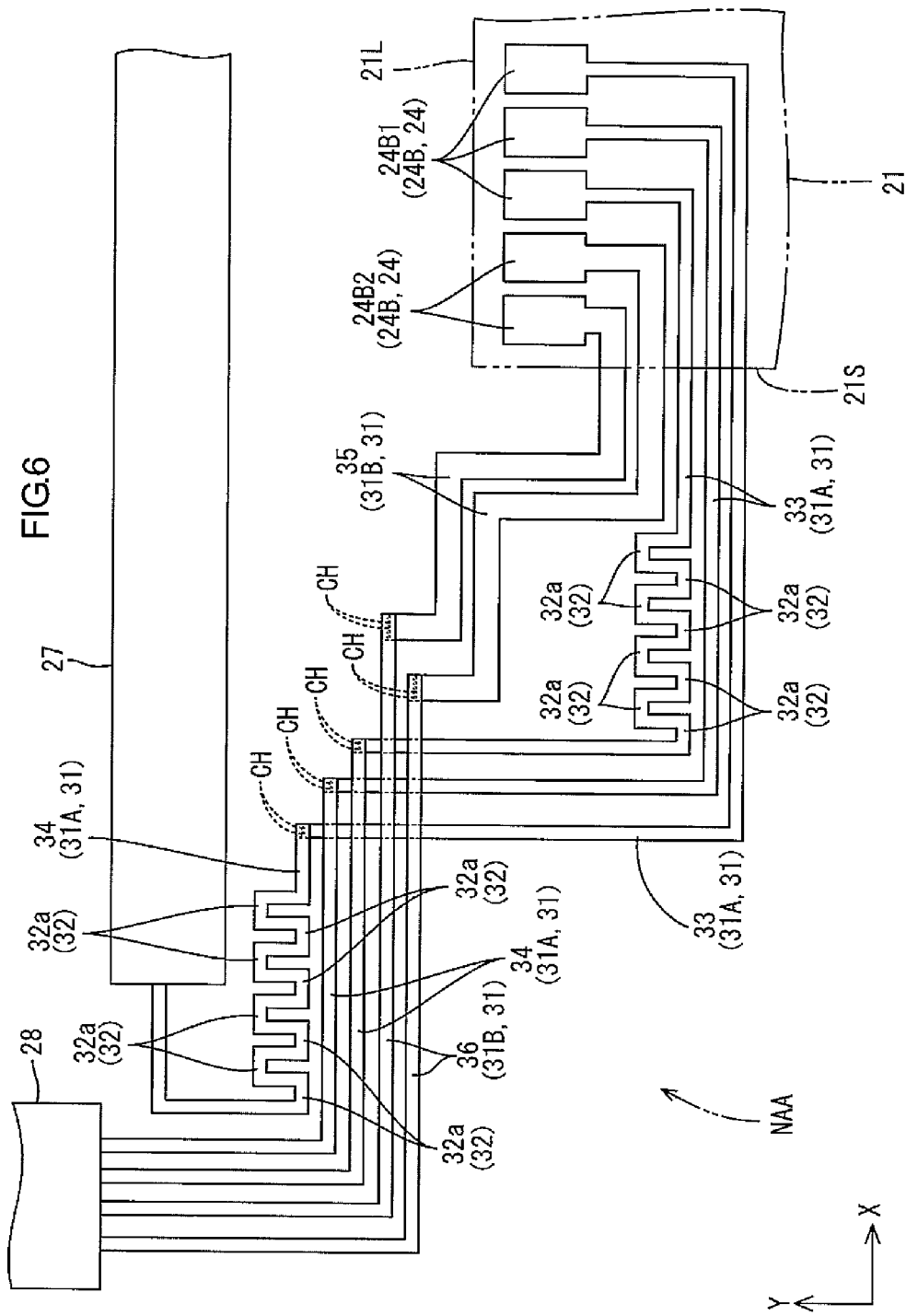
FIG. 6 is a plan view illustrating arrangement of control signal lines and panel-side output terminals.
Figure 7:
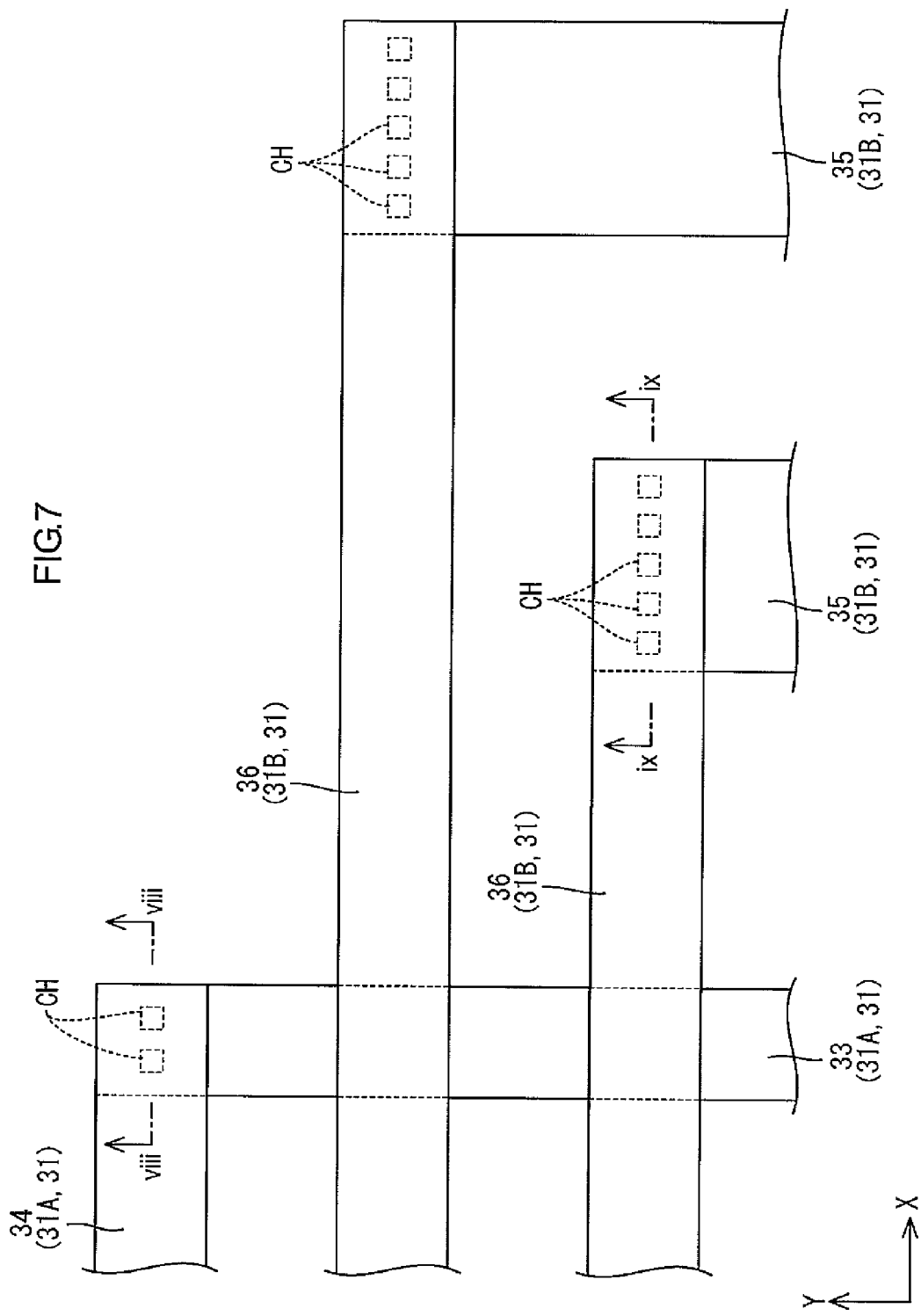
FIG. 7 is a plan view illustrating areas including contact holes for connecting first line sections of control signal lines to second line sections thereof.
Figure 8:
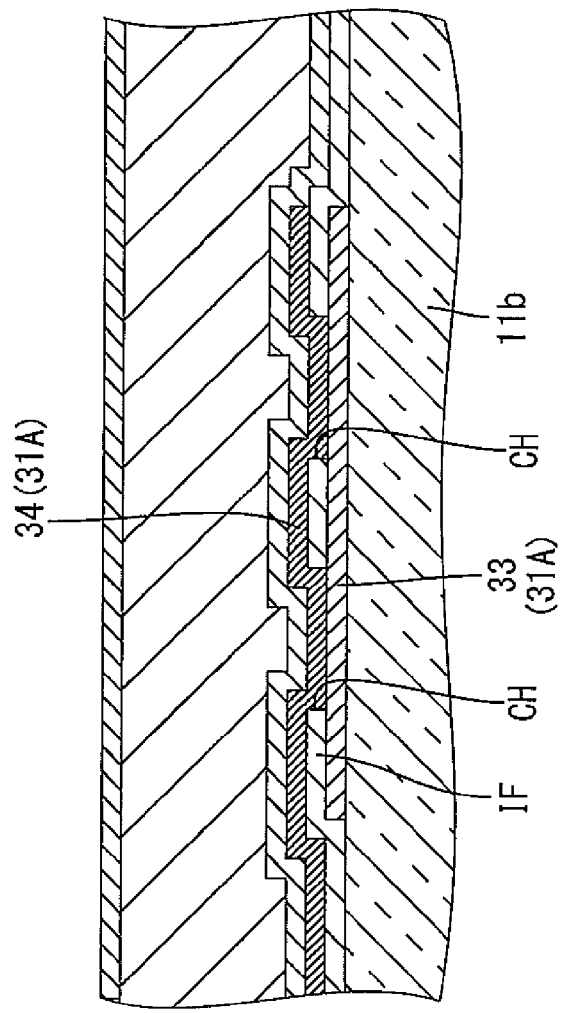
FIG. 8 is a cross-sectional view of FIG. 7 along line viii-viii.

As illustrated in FIG. 6, each first control signal line 31A is divided into two sections at a bending portion before the column control circuit 27 (the third bending portion from the first panel-side control output terminal 24B1) formed from different metal films. The section of the first control signal line 31A closer to the first panel-side control output terminal 24B1 than the bending point, which is the boundary, is formed from the first metal film in the lower layer. The section of the first control signal line 31A farther from the first panel-side control output terminal 24B1 (closer to the column control circuit 27 (or the display area AA)) is the second line section 33 formed from the second metal film in the upper layer layered on the first metal film via the insulating film IF. As illustrated in FIGS. 7 and 8, an end of each first line section 33 and an end of a corresponding second line section 33 overlap each other in a plan view at the bending point, which is the boundary, and electrically connected to each other via contact holes CH in the insulating film IF. In FIG. 7, contact holes CH are indicated with chain lines. Two contact holes CH are formed at a portion corresponding to overlapping portions of the first line section 33 and the second line section 34 for connecting the first line section 33 to the second line section 34 of the first control signal line 31A. According to the configuration, the first line section 33 and the second line section 33 arranged in different layers via the insulating film IF are electrically connected to each other at two points. Two contact holes CH are arranged in the X-axis direction corresponding with a width direction of the first line section 33. As illustrated in FIG. 6, the first line section 33 of each first control signal line 31A extends from the corresponding first panel-side control output terminal 24B1 and crosses the second lines 34 of other first control signal lines 31A and the second signal control lines 31B, which will be described later, via the insulating film IF before connected to the second line section 33. The second line section 33 of each first control signal line 31A not connected to the column control circuit 27 crosses the first line or lines 33 of other first control signal line or lines 31A between the connecting point with the first line section 33 and the column control circuit 27 or the row control circuit 28 via the insulating film IF. The first line section 33 and the second line section 33 of each first control signal line 31A have widths that are about equal to each other.

As illustrated in FIG. 6, three first control signal lines 31A include one that includes an end connected to the column control circuit 27 and ones (two of them) that include ends connected to the row control circuit 28. The first line sections of two first control signal lines 31A connected to the row control circuit 28 extend from the respective first panel-side control output terminals 24B1 located between the second panel-side control output terminal 24B2 and the first panel-side control output terminal 24B1 to which the first control signal line 31A is connected. The second line sections 34 of the first control signal lines 31A extend outward from points at which connected with the respective first line sections 33 along the X-axis direction. Then, the second line sections 34 bend at an about right angle and extend along the Y-axis direction to the short edge of the row control circuit 28. The first line section 33 of the first control signal line 31A connected to the first panel-side control output terminal 24B1 adjacent to the second panel-side control output terminal 24B2 includes a serpentine portion 32 that is a portion of the first control signal line 31A extending along the X-axis direction arranged outside the driver 21 mounting area. The first line section 33 of the first control signal line 31A connected to the column control circuit 27 extends from the first panel-side control output terminal 24B1 adjacent to the panel-side image output terminal 24A located at the outermost. The second line section 34 of the first control signal line 31A extends outward from a point at which connected with the first line section 33 along the X-axis direction. Then, the second line section 34 bends at an about right angle twice and extends to the short edge of the column control circuit 27. A portion of the first control signal line 31A extending along the X-axis direction is a serpentine portion 32. Each serpentine portion 32 is formed in a serpentine shape in a plan view. The serpentine portion 32 is formed by arranging turn portions 32a along X-axis direction such that adjacent turn portions 32 are oppositely orientated. Each of the turn portions 32a is formed by bending a portion of the first control signal line 31A at the about right angle twice. In comparison to the first control signal lines 31A that do not include the serpentine portions 32, the first control signal lines 31A that include the serpentine portions 32 have a longer extending distance (a line length) and a higher resistance. As described earlier, the first control signal lines 31A including the serpentine portions 32 include one that is connected to the column control circuit 27 and one that is connected to the row control circuit 28. The column control circuit 27 and the row control circuit 28 include the ESD protection circuits, respectively. Therefore, even if the first control signal lines 31A that include the serpentine portions 32 receive surges due to ESD, the surges are absorbed by the ESD circuits. With this configuration, the row control circuit 28 and the column control circuit 27 are protected from surges. In FIG. 4, the serpentine portions 32 are illustrated in a simple form.

As illustrated in FIG. 4, the second panel-side control output terminals 24B2 connected to the second control signal lines 31B among the panel-side output terminals 24 are arranged adjacent to the first panel-side control output terminals 24B1 and away from the panel-side image output terminals 24A (i.e., at the outermost among the panel-side output terminals 24). Namely, the second panel-side control output terminals 24B2 are arranged such that the first panel-side output terminals 24B1 are between the second panel-side control output terminals 24B2 and one of the panel-side image output terminals 24A located at the leftmost in FIG. 4. The second panel-side control output terminals 24B2 connected to the second control signal line 31B is located at the closest to the row control circuit 28 among the panel-side output terminals 24. Two second control signal lines 31B and two second panel-side control output terminals 24B2 are arranged in the X-axis direction. In comparison to a configuration in which the locations of the first panel-side control output terminals and the second panel-side control output terminals are switched around, the second panel-side control lines 31B are smaller in ling length than the first control signal lines 31A. In addition to the fact that the second control signal lines 31B have the width larger than that of the first control signal lines 31A, the line resistance is further lower. Furthermore, the lengths of the second control signal lines 31B in the driver 21 mounting area are smaller. Therefore, the driver 21 is less likely to mechanically interfere with the second control signal lines 31B and circuits in the diver 21 are less likely to be affected by noise. The second control signal lines 31B extend from the second panel-side control terminals 24B2 to the direction opposite to the column control circuit 27 (or the display area AA) along the Y-axis direction. The second control signal lines 31B bend at the about right angle at points farther away from the panel-side input terminals 23 in comparison to the first control signal lines 31A. Then, the second control signal lines 31B extend along the X-axis direction. The second control signal lines 31B cross the short edge 21S of the driver 21 and extend to the area outside the driver 21 mounting area. The second control signal lines 31B bend at the about right angle at the predefined positions and extend along the Y-axis direction toward the column control circuit 27 (or the display area AA). Then, the second control signal line 31B bend at the about right angle and extend outward, that is, toward the row control circuit 28 along the X-axis direction before reaching the column control circuit 27. The second control signal lines 31B bend at the about right angle again and extend along the Y-axis direction toward the column control circuit 27 (or the display surface AA). The second control signal lines 31B bend at the about right angle again and extend outward along the X-axis direction. The second control signal lines 31B cross three first control signal lines 31A and bend at the right angle such that the second control signal lines 31B extend along the Y-axis direction until they reach the short edge of the row control circuit 28.

As illustrated in FIG. 6, the second control signal lines 31B are formed from two different metal films similar to the first control signal lines 31A described above. Specifically, each second control signal line 31B includes sections divided at the bending point before crossing the first control signal line 31A (the fifth bending point from the second panel-side control output terminal 24B2). The sections are formed from the different metal films. The section closer to the second panel-side control output terminal 24B2 than the bending point is formed from the first metal film in the lower layer and referred to as a first line section 35. The section farther from the second panel-side control output terminal 24B2 (closer to the column control circuit 27 (or the display area AA)) than the bending point is formed from the second metal film in the upper layer that is layered on the first metal film via the insulating film IF and referred to as a second line section 36. Each second control signal line 31B has two different widths. The width of the first line section 35 is larger than the width of the second line section 36. Each second control signal line 31B is arranged in the driver 21 mounting area and connected to the second panel-side control output terminal 24B2. Furthermore, the second control signal line 31B includes the first line section 35 having the larger line width (a wide section) and the second line section 36 having the smaller line width, that is, a narrow section (a reference width section). The second line section 36 is arranged outside the driver 21 mounting area for an entire length thereof and connected to the row control circuit 28. The first line section 35 of the second control signal line 31B including a section that crosses the short edge 21S of the driver 21 is arranged in the portion of the non-display area NAA including larger extra space in comparison to the portion thereof between the panel-side output terminals 24 and the display area AA. Therefore, the first line section 35 can be widened. According to the configuration, the line resistance of the second control signal line 31B can be reduced while the non-display area NAA is maintained small. The width of the first line section 35 and the second line section 36 of each second control signal line 31B are substantially constant (substantially do not change) for the entire lengths thereof, respectively. The width of the second line section 36 is about equal to the width of the first control signal line 31A (the first line section 33 and the second line section 34). Namely, only the width of the first line section 35 is larger than the first control signal line 31A. The portion of the second line section 36 of the second control signal line 31B extending outward from the connecting porting with the first line section 35 along the X-axis direction crosses the first line section 33 of the first control signal line 31A via the insulating film IF. The first line section 35 does not cross the first control signal line 31A.

Two second control signal lines 31B include at least one of lines for transmitting clock signals, which are control signals, to the row control circuit 28 (a clock signal control line) and for transmitting power supply voltage signals, which are control signals, to the row control circuit 28 (a power supply control line). The second control signal line 31B for transmitting the clock signals is a kind of line that is not expected to cause dull edges on pulse waveforms of the clock signals. With the second control signal line 31B having the width larger than that of the first control signal line 31 and the lower line resistance, clock signals having stable pulse waveforms are supplied to the TFTs 17. The second control signal line 31B for the transmitting the power supply voltage signals is a kind of line that is not expected to cause a voltage drop to stably drive the row control circuit 28. With the second control signal line 31B having the width larger than that of the first control signal line 31 and the lower line resistance, the row control circuit 28 stably operates. As illustrated in FIG. 6, the first line sections 35 of the second control signal lines 31B are routed so as not to cross the first control signal lines 31A as described earlier. In comparison to a configuration in which the first line sections cross the first control signal lines 31A, overlapping areas are small. Signals transmitted to the first control signal lines 31A are less likely to affect the clock signals or the power supply voltage signals transmitted to the second control signal lines 31B.

Each of the first control signal lines 31A has the smaller width and the higher line resistance than the second control signal lines 31B. In this embodiment, the first control signal lines 31A are configured to transmit signals other than the clock signals and the power supply voltage signals (e.g., initial signals, start pulses, scanning direction switching signals.

Figure 9:
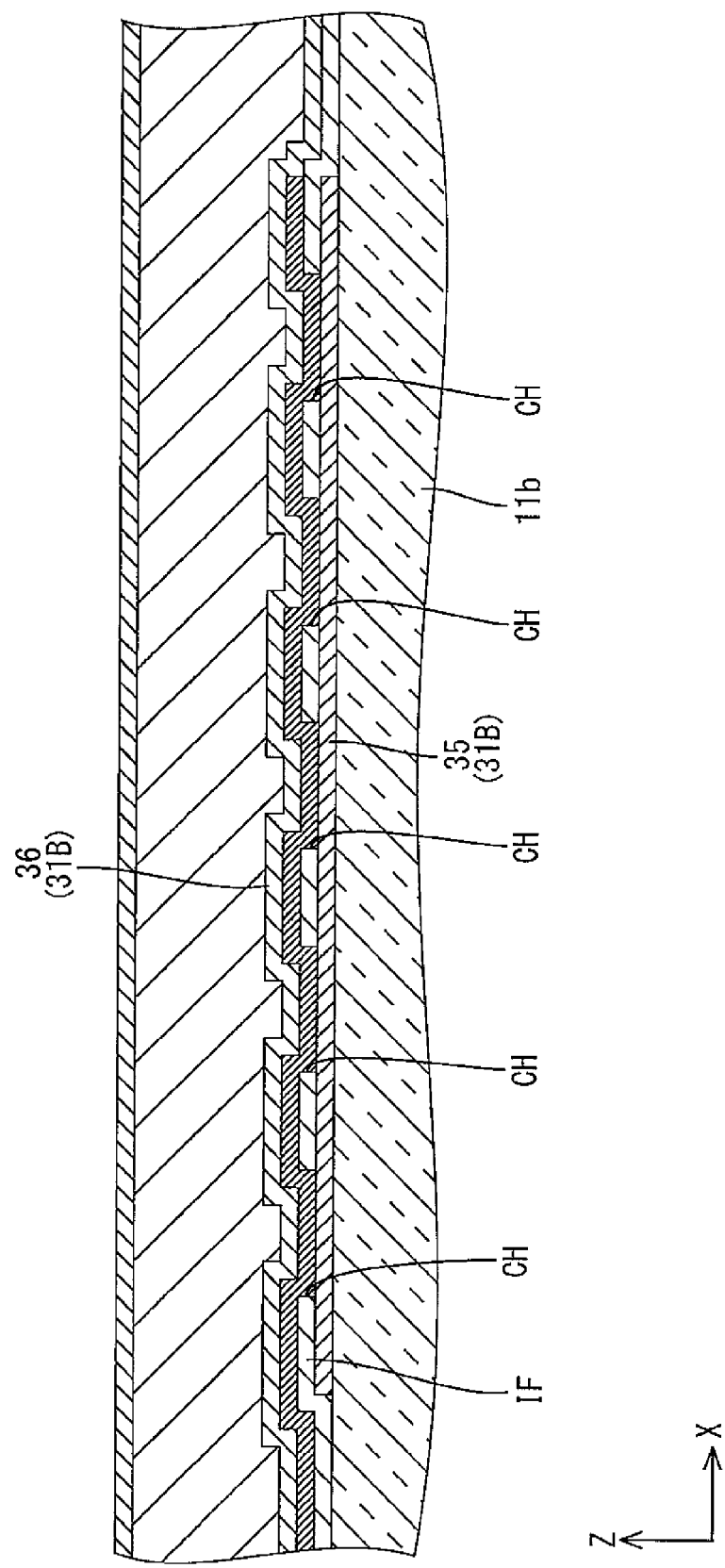
FIG. 9 is a cross-sectional view of FIG. 7 along line ix-ix.

As illustrated in FIGS. 7 and 9, an end of the first line section 35 and an end of the second line section 36 of each second control signal line 31B overlap each other at the bending point that is different from the dividing point described above in a plan view. The first line section 35 and the second line section 36 are electrically connected to each other via contact holes CH formed in an area of the insulating film corresponding to the overlapping area. Five contact holes CH are formed in the area corresponding to overlapping portions of the first line section 35 and the second line section 36 for connecting the first line section 35 and the second line section 36 of the second control signal lines 31B. The first line section 35 and the second line section 36 that are disposed in different layers via the insulating film IF are electrically connected to each other at five points. The five contact holes CH are arranged at equal intervals along the width direction of the first line section 35 having the larger line width which corresponds to the X-axis direction. The interval is about equal to the interval between the contact holes in the first control signal line 31A. The line width of first line section 35 is larger than that of the first line section 33 and that of the second line section 34 of the first control signal line 31A. In comparison to the first control signal line 31A, the larger number of the contact holes CH, that is, five contact holes CH are linearly arranged.

As illustrated in FIG. 6, the first line section 33 of the first control signal line 31A of three first control signal lines 31A connected to the column control circuit 27 is routed at the outermost (farther from the column control circuit 27) among five control signal lines 31. Furthermore, the second line section 34 of the first control signal line 31A is arranged at the innermost (closer to the column control circuit 27) among five control signal lines 31. Therefore, the first line section 33 crosses the second line sections 34, 36 of other four control signal lines 31 via the insulating film IF. The first line section of the first control signal line 31A connected to the row control circuit 28 and does not include the serpentine portion 32 is arranged at the second outermost and the second line section 34 is arranged at the second innermost. Therefore, the first line section 33 crosses the second line sections 34, 36 of the first control signal line 31A and two second control signal lines 31B connected to the row control circuit 28 and including the serpentine portions 32 via the insulating film IF. The first line section 33 and the second line section 34 of the first control signal line 31A connected to the row control circuit 28 and including the serpentine portion 32 are arranged in the middle. Therefore, the first line section 33 crosses the second line sections 36 of two second control signal lines 31B via the insulating film. IF. Namely, three first control signal lines 31A are routed such that the first line sections 33 of the first control signal lines 31A cross two second control signal lines 31B and the ends thereof closer to the column control circuit 27 are connected to the ends of the second line sections 34 via the contact holes CH. The first line sections 35 of two second control signal lines 31B are parallel to each other and cross none of the first control signal lines 31A. However, the second line sections 36 cross the first line sections 33 of three first control signal lines 31A via the insulating film IF.

Although the detail is not included in the drawings, each image signal line 30 includes a first line section and a second line section similar to the control signal lines 31. The first line section is formed from the first metal film that also forms the gate lines 19 and the panel-side image output terminals 24A and connected to the corresponding panel-side image output terminal 24A. The second line section is formed from the second metal film that also forms the source lines 20 and connected to the column control circuit 27. Overlapping portion of the first line section and the second line section are connected to each other via contact holes formed in the insulating film.

As described earlier, the liquid crystal display device (a display device) 10 according to this embodiment includes the liquid crystal panel (a display panel) 11, the driver (a panel driver) 21, the panel-side output terminals 24, the image signal lines 30, and the control signal lines 31. The liquid crystal panel 11 includes the display area AA configured to display images and the non-display area NAA. The driver 21 is mounted in the non-display area NAA and configured to drive the liquid crystal panel 11 by generating output signals from the input signals supplied by the control circuit board (an external signal source) 12 and transmitting the output signals to the display area AA. The driver has the longitudinal shape that extends along the edge of the liquid crystal panel 11. The panel-side output terminals 24 are disposed in the non-display area NAA and connected to the driver 21. The panel-side output terminals 24 include the panel-side image output terminals 24A and the panel-side control output terminals 24B. The panel-side image output terminals 24A are disposed along the long edge 21L of the driver 21. The panel-side control output terminals 24B are disposed along the long edge 21L of the driver 21. The image signal lines 30 are disposed in the non-display area NAA. The image signal lines 30 extend from the respective panel-side image output terminals 24A toward the display area AA and cross the long edge 21L of the driver 21. The image signal lines 30 spread in the fan-like form. The image signal lines 30 are for transmitting the image signals included in the output signals. The control signal lines 31 are disposed in the non-display area NAA. The control signal lines 31 extend from the respective panel-side control output terminals 24B toward the display area AA. The control signal lines 31 cross the short edge 21S of the driver 21. The control signal lines 31 are for transmitting the control signals included in the output signals.

According to the configuration, the driver 21 mounted in the non-display area NAA of the liquid crystal panel 11 generates output signals by processing input signals from the control circuit board 12 and outputs the output signals. The panel-side output terminals 24 arranged in the non-display area NAA are connected to the driver 21. Image signals and control signals included in the output signals from the driver 21 are transmitted to the display area AA through the image signal lines 30 and the control signal lines 31 via the panel-side output terminals 24. As a result, the liquid crystal panel 11 is driven.

The panel-side output terminals 24 include the panel-side image output terminals 24A and the panel-side control output terminals 24B that are arranged along the long edge 21L of the driver 21. In comparison to a configuration in which the panel-side image output terminals are arranged along the long edge 21L of the driver 21 and the panel-side control output terminals are arranged along the short edge 21S of the driver 21, a large area is not required for arranging the panel-side output terminals 24 along the short edge 21S of the driver 21. Namely, the portion of the non-display area along the short edge 21S of the driver 21 is maintained small. This configuration is preferable for reducing the overall size and the frame size of the liquid crystal display device 10.

The control signal lines 31 extend from the respective panel-side control output terminals 24B toward display area AA so as to cross the short edge 21S of the driver 21. In comparison to a configuration in which the control signal lines are routed along the image signal lines 30 that extend from the panel-side image output terminals 24A toward the display area AA so as to cross the long edge 21L of the driver 21 and spread in a fan-like form, the area for routing the control signal lines 31 between the panel-side output terminals 24 and the display area AA is not required. Therefore, a larger area is provided for arranging the image signal lines 30 that spread in the fan-like form. Even if the number of the image signal lines 30 is increased as the definition of the display area AA is increased, the image signal lines 30 can be routed while the distance between the panel-side output terminals 24 and the display area AA, that is, the non-display area NAA is maintained small. This configuration is preferable for reducing the overall size and the frame size of the liquid crystal display device 10.

The control signal lines 21 include the first control signal lines 31A and the second control signal lines 31B. At least a portion of each second control signal lines 31B has the line width larger than that of the first control signal lines 31A. The control signal lines 31 that cross the short edge 21S of the driver 21 include the first control signal lines 31A and the second control signal lines 31B. At least a portion of each second control signal lines 31B has the line width larger than that of the first control signal lines 31A. In comparison to a configuration in which all the control signal lines are the second control signal lines 31B, the portion of the non-display area in which the control signal lines 31 are arranged is small. This configuration is more preferable for reducing the overall size and the frame size of the liquid crystal display device 10 while reducing the line resistance of the second control signal lines 31B.

The panel-side control output terminals 24B include the first panel-side control output terminals 24B1 and the second panel-side control output terminals 24B2. The first signal lines 31A are connected to the respective panel-side control output terminals 24B. The panel-side control output terminals 24B are disposed adjacent to one of the panel-side image output terminals 24A at the end. The second control signal lines 31B are connected to the respective second panel-side control output terminals 24B2. The second panel-side control output terminals 24B2 are disposed such that the first panel-side control output terminals 24B1 are between the panel-side image output terminal 24A at the end and the second panel-side control output terminals 24B2. The second control signal lines 31B extend from the respective second panel-side control output terminals 24B2. The second panel-side control output terminals 24B2 are disposed such that the first panel-side control output terminals 24B1 to which the first control signal lines 31A are connected are between the panel-side image output terminal 24A at the end and the second panel-side control output terminals 24B2. The line length of each second control signal line 31B is smaller than the line length of each first control signal line 31A. According to this configuration, the line resistance of each second control signal line 31 is further reduced.

Each first control signal line 31A includes at least the first line section 33 and the second line section 34. Each second control signal line 31B includes the first line section 35 and the second line section 36. The first line sections 33, 35 are disposed closer to the panel-side control output terminals 24B. The second line sections 34, 36 are disposed farther from the panel-side control output terminals 24B. A portion of each second line section 34 or 36 overlaps a portion of the corresponding first line section 33 or 35. The insulating film IF is disposed between the first line sections 33, 35 and the second line sections 34, 36. The insulating film IF includes the contract holes CH in the portions corresponding to the overlapping portions of the first line sections 33, 35 and the second line sections 34, 36 for connecting the line section 33, 34, 35, 36. The number of the contact holes CH in the insulating film IF for connecting the first line sections 33, 35 of the second control signal lines 31B to the respective second line sections of the second control signal lines 31B is larger than the number of the contract holes CH for connecting the first line sections 33, 35 of the first control signal lines 31A to the respective second line sections 34, 36 of the first control signal lines 31A. The first control signal lines 31A and the second control signal lines 31B include at least the first line sections 33, 35 and the second line sections 34, 36 that are connected to one another via the contact holes CH in the insulating film IF. According to the configuration, high flexibility is achieved in layout design of the first control signal lines 31A and the second control signal lines 31B in the non-display area NAA. Furthermore, the number of the contact holes CH for connecting the first line sections 33, 35 of the second control signal lines 31B to the second line sections 34, 36 of the second control signal lines 31B is larger than the number of the contact holes CH for connecting the first line sections 33, 35 of the first control signal lines 31A to the second line sections 34, 36 of the first control signal lines 31A. Therefore, resistance regarding the connection between the first line sections 33, 35 and the second line sections 34, 36 is small. This configuration is preferable for further reduction of the line resistance.

The TFTs (switching components) 17 are arranged in the matrix in the display area AA. The row control circuit 28 is connected to at least ends of the control signal lines 31 closer to the display area AA and configured to control inputs of the control signals to the TFTs 17. The column control circuit 27 is connected to at least ends of the image signal lines 30 closer to the display area AA. The column control circuit 27 is configured to control inputs of the image signals to the TFTs 17. The inputs of at least the control signals from the control signal lines 31 to the TFTs 17 arranged in the matrix in the display area AA are controlled by the row control circuit 28. Furthermore, the inputs of at least the image signals from the image signal lines 30 to the TFTs 17 are controlled by the column control circuit 27. With this configuration, the TFTs 17 are properly driven and specified images are properly displayed in the display area AA.

The second control signal lines 31B include at least a clock control signal line and a power supply control signal line. The clock control signal line is configured to transmit clock signals, which are one kind of the control signals. The power supply control signal line is configured to transmit power supply control signals for driving at least one of the row control circuit 28 and the column control circuit 27. Among the control signal lines 31, the clock control signal line is a kind of lines that is not expected to cause dull edges on the pulse waveform of the clock signals, which are control signals. The power supply control signal line is a kind of lines that is not expected to cause a voltage drop to stably drive the row control circuit 28 and the column control circuit 27. With the clock control signal line and the power source control signal line configured as the second control signal lines 31B that include at least portions having the larger widths, the line resistances thereof can be reduced. As a result, the clock signals having a stable pulse waveform are supplied to the TFTs 17. Furthermore, the row control circuit 28 and the column control circuit 27 are stably driven.

At least one of the first control signal lines 31A includes the serpentine portion at a middle section thereof. At least one of the row control circuit 28 and the column control circuit 27 includes the ESD protection circuit electrically connected to the first control signal line 31A that includes the serpentine portion 32. With the serpentine portion 32, the line resistance of the first control signal line 31A is higher than a configuration without the serpentine portion 32. The first control signal line 31A that includes the serpentine portion 32 is electrically connected to at least one of the row control circuit 28 and the column control circuit 27 that includes the ESD protection circuit. Even if a surge is input to the first control signal line 31A that includes the serpentine portion 32 due to an electro-static discharge, the surge is passed to the ESD protection circuit. With this configuration the row control circuit 28 and the column control circuit 27 are protected from the surge.

The TFTs 17, the row control circuit 28, and the column control circuit 27 include polycrystalline silicon thin films. In comparison to amorphous silicon thin films, the electron mobility of the polycrystalline silicon thin films is higher. This configuration is preferable for improving definition and reducing power consumption.

Each second control signal line 31B includes the section extending from the panel-side control output terminal 24B and crossing the short edge 21S of the driver 21 (the first line section 35). At least the section has the larger line width. The section of the second control signal line 31B extending from the panel-side control output terminal 24B and crossing the short edge 21S of the driver 21. The section that crosses the short edge 21S of the driver 21 is arranged in the portion of the non-display area NAA including larger extra space in comparison to the portion thereof between the panel-side output terminals 24 and the display area AA. Therefore, the first line section 35 can be widened. According to the configuration, the line resistance of the second control signal line 31B can be reduced while the non-display area NAA is maintained small. In comparison to a configuration in which all control signal lines 31 are the second control signal lines 31B that include the sections crossing the short edge 21S of the driver 21 and widened, the area in which the driver 21 is disposed is reduced in the direction along the short edge 21S.

The direction in which the control signal lines 31 extend from the panel-side control output terminals 24B is opposite to the direction in which the image signal lines 30 extend from the panel-side image output terminals 24A. The control signal lines 31 are disposed between the panel-side control output terminals 24B and the display area AA. A further larger area is provided for routing the image signal lines 30 that spread in the fan-like form between the panel-side output terminals 24 and the display area AA. This configuration is effective when the number of the image signal lines 30 is increased as the definition of the liquid crystal display device 10 is improved.

The panel-side control output terminals 24B are disposed at the end of the long edge 21L of the driver 21. Each control signal line 31 extends from the panel-side control output terminal 24B and crosses the short edge 21S of the driver 21. The length of the portion of the control signal line 31 overlapping the driver 21 is reduced as much as possible according to the above configuration. Therefore, mechanical interference between the control signal lines 31 and the driver 21 is less likely to occur and circuits in the driver 21 are less likely to be subject to noise.

The panel-side input terminals 23 are disposed parallel to the panel-side output terminals 24 along the short edge 21S of the driver 21 in the non-display area NAA. The panel-side input terminals 23 are connected to the driver 21. The control signal lines 31 are routed in the area between the panel-side output terminals 24 and the panel-side input terminals 23. Input signals from the control circuit board 12 are transmitted to the driver 21 via the panel-side output terminals 24. The control signal lines 31 are arranged in the area between the panel-side output terminals 24 and the panel-side input terminals 23 that are arranged parallel to each other and along a direction parallel to the short edge 21S of the driver 21. The control signal lines 31 are routed so as to cross the short edge 21S of the driver 21.

The display panel is a liquid crystal display panel 11 including a pair of substrate 11a, 11b and a liquid crystal layer (liquid crystals) 11c sealed between the substrates 11a, 11b. Applications of such a display device, that is, the liquid crystal display device 10 include electronic devices including personal digital assistances, mobile phones, notebook computers, and portable video game players.

The liquid display device 10 further includes the backlit unit (a lighting device) 14 arranged opposite the liquid crystal panel 11 and away from a display surface of the liquid crystal panel 11. The backlight unit 14 is configured to provide the liquid crystal panel 11 with light. Images are displayed in the display area AA of the liquid crystal panel 11 with the light provided by the backlight unit 14.

Second Embodiment

A second embodiment will be described with reference to FIGS. 10 and 11. The second embodiment includes inspection lines 37 and inspection terminals 38. Configurations, functions, and effects similar to those of the first embodiment will not be described.

Figure 10:
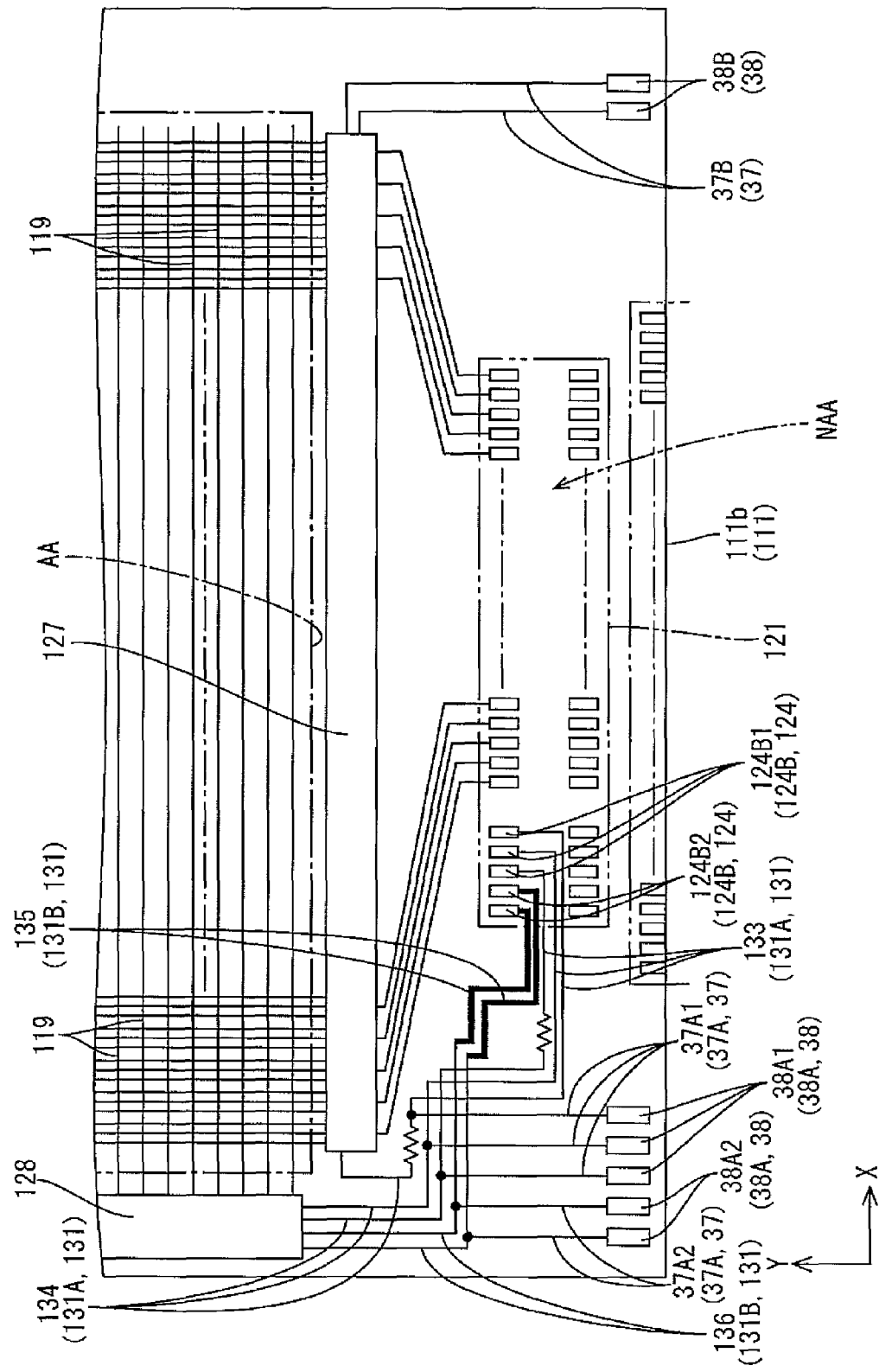
FIG. 10 is a plan view illustrating a configuration of lines at end of an array board of a liquid crystal panel on which a driver and a flexible circuit board are mounted according to a second embodiment of the present invention.

As illustrated in FIG. 10, the inspection lines 37 are disposed in a non-display area NAA of an array board 111b according to this embodiment. The inspection lines 37 are for electrical inspections on control signal lines 131 and a column control circuit 127 when connected to them. In the non-display area NAA, the inspection terminals 38 are disposed. Ends of the inspection lines 37 away from the control signal lines 131 and the column control circuit 127 are connected to the inspection terminals 38. The inspections using the inspection lines 37 and the inspection terminals 38 are performed in a stage of the production process of a liquid crystal panel 111 before mounting of a driver 121. The inspection lines 37 include two kinds of lines, control signal line inspection lines 37A and column control circuit inspection lines 37B. An end of the control signal line inspection line 37A is connected to the corresponding control signal line 131. An end of each column control circuit inspection line 37B is connected to the column control circuit 127. The inspection terminals 38 include two kinds of terminals, control signal line inspection terminals 38A and column control circuit inspection terminals 38B. The control signal line inspection terminals 38A include terminals to which ends of the respective control signal line inspection line 37A is connected. Ends of the respective column control circuit inspection lines 37B are connected to the column control circuit inspection terminals 38B. In the following description, the control signal line inspection lines and the control signal line inspection terminals will be indicated by the reference numeral with the suffix A and the column control circuit inspection lines and the column control circuit inspection terminals will be indicted by the reference numeral with the suffix B when they need to be distinguished from each other. When they do not need to be distinguished from each other, the suffixes will not be added. Two column control circuit inspection terminals 38B are arranged in an area of the array board 111b on the right side in FIG. 10 with respect to the X-axis direction, that is, away from an area in which the row control circuit 128 (or the control signal lines 131). The column control circuit inspection lines 37B are connected to the respective column control circuit inspection terminals 38B and the short edge of the column control circuit 127 different from the short edge to which the first control signal line 131A is connected. Two column control circuit inspection lines 37B are parallel to each other. An inspection pad, which is not illustrated, is brought in contact with the column control circuit inspection terminals 38B to detect electrical defects such as breaks and short-circuits.

As illustrated in FIG. 10, five control signal line inspection terminals 38A are arranged along the X-axis direction in an area of the array board 111b opposite to the row control circuit 128 (or the display area AA) in the Y-axis direction with respect to the area in which the control signal lines 131 are arranged (close to the edge of the array board 111*b*). The control signal line inspection lines 37A according to this embodiment include first control signal line inspection lines (first inspection lines) 37A1 and second control signal line inspection lines (second inspection lines) 37A2. The first control signal line inspection lines 37A1 are connected to the respective first control signal lines 131A. The second control signal line inspection lines 37A2 are connected to the respective second control signal lines 131B. The control signal line inspection terminals 38A include first control signal line inspection terminals (first inspection terminals) 38A1 and second control signal line inspection terminals (second inspection terminals) 38A2. The first control signal line inspection terminals 38A1 are connected to the respective first control signal line inspection lines 37A1. The second control signal line inspection terminals 38A2 are connected to the respective second control signal line inspection lines 37A2. Three first control signal line inspection lines 37A1 and three first control signal line inspection terminals 38A1 are disposed closer to the panel-side output terminals 124 (or the driver 121) with respect to the X-axis direction. Two second control signal line inspection lines 37A2 and two second control signal line inspection terminals 38A2 are disposed away from the panel-side output terminals 124 (or the driver 121) with respect to the X-axis direction. In the following description, regarding the control signal line inspection lines 37A and the control signal line inspection terminals 38A, the first control signal line inspection lines and the first control signal line inspection terminal will be indicated by the reference numeral with the suffix 1 and the second control signal line inspection lines and the second control signal line inspection terminal will be indicted by the reference numeral with the suffix 2 when they need to be distinguished from each other. When they do not need to be distinguished from each other, the suffixes will not be added.

Figure 11:
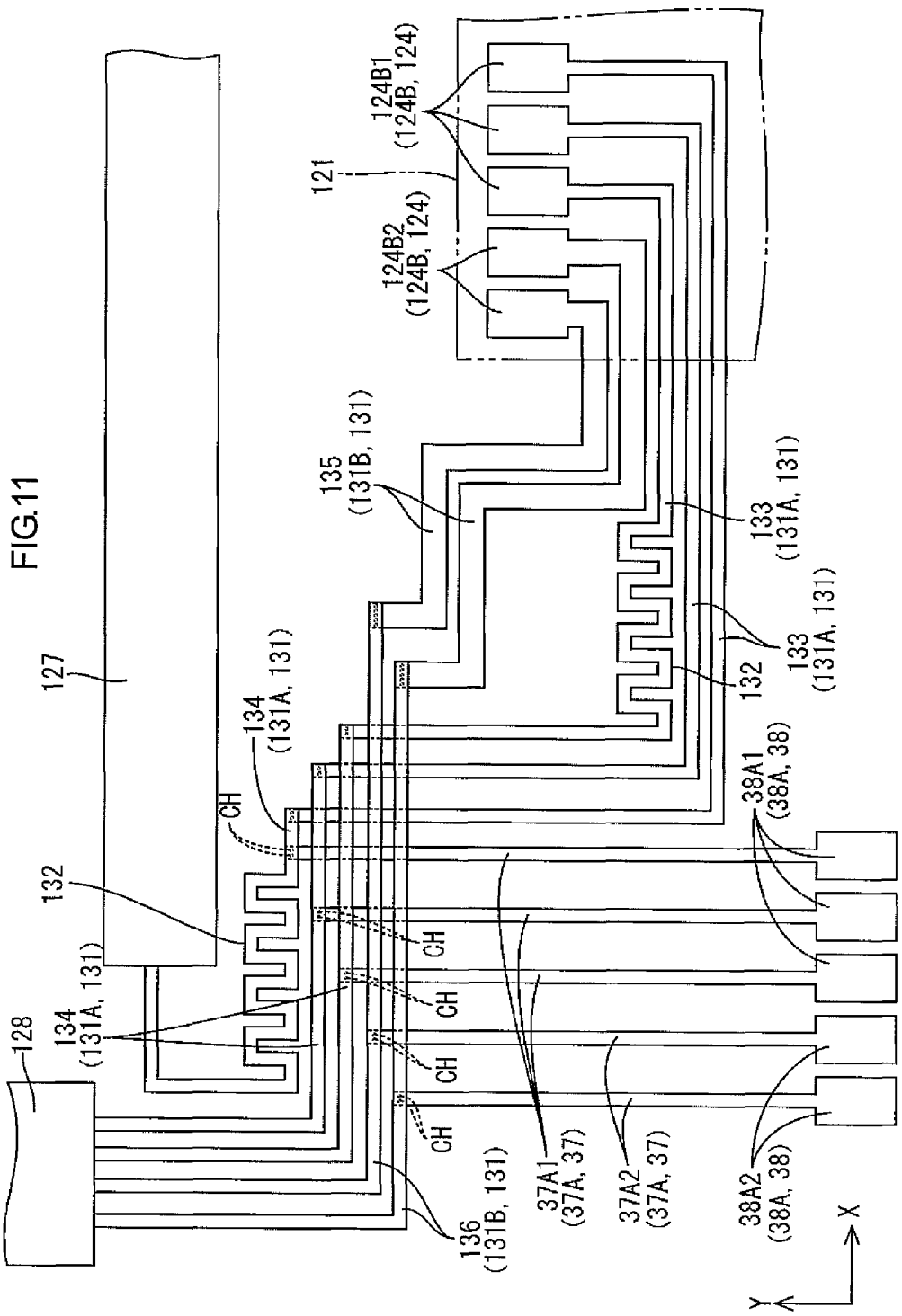
FIG. 11 is a plan view illustrating arrangement of control signal lines, panel-side control output terminals, inspection lines, and inspection terminals.

As illustrated in FIG. 11, the first control signal line inspection lines 37A1 are formed from the first metal film that also forms gate lines 119 and connected to second line sections of first control signal lines 131A. The first control signal line inspection lines 37A1 extend from the respective first control signal line inspection terminals 38A1 in the Y-axis direction toward the column control circuit 127 (or the display area AA). The first control signal line inspection lines 37A1 cross the second line sections 136 of the second control signal lines 131B and the second line sections 134 of other first control signal lines 131A. An end of each first control signal line inspection line 37A1 (an end away from the first control signal line inspection terminal 38A1) is arranged so as to overlap a portion (outer than a connecting point with the first line section 133 with respect to the X-axis direction) of the second line section 134 of the first control signal line 131A to which the first control signal line inspection line 37A1 is connected. The first control signal line inspection lines 37A1 and the portions of the second line sections 134 of the first control signal lines 131A to which the first control signal line inspection lines 37A1 are connected are electrically connected to each other via through holes CH formed in an insulating film (not illustrated). A configuration of each first control signal line inspection line 37A1 using the contract holes CH are similar to the configuration for connecting the first line section 33 or 35 to the second line section 34 or 36 in the first embodiment (see FIGS. 8 and 9). Two contact holes CH are formed in a portion corresponding to an overlapping portion between each first control signal line inspection line 37A1 and the corresponding second line section 134 for connecting the first control signal line inspection lines 37A1 to the second line sections 134 of the respective first control signal lines 131A. The contact holes CH are arranged along the X-axis direction that is the width direction of the first control signal line inspection line 37A1. Among three first control signal line inspection lines 37A1 parallel to one another, the first control signal line inspection lines 37A1 on the right in FIG. 11 is connected to the second line section 134 of the first control signal line 131A that is connected to the column control circuit 127. The connecting point is between the portion of the second line section 134 connected with the first line section 133 and a serpentine portion 132. The first control signal line inspection line 37A1 in the middle in FIG. 11 is connected to the row control circuit 128 and the second line section 134 of the first control signal line 131A that does not include the serpentine portion 132. The first control signal line inspection line 37A1 on the left in FIG. 11 is connected to the row control circuit 128 and the second line section 134 of the first control signal line 131A that includes the serpentine portion 132. An inspection pad that is not illustrated is brought into contact with the first control signal line inspection terminals 38A1 to inspect the first control signal lines 131A (especially the second line sections 134) for electrical failures (continuity) such as breaks or short circuits.

As illustrated in FIG. 11, the second control signal line inspection lines 37A2 are formed from the first metal film that also form the gate lines 119 and connected to the second line sections 136 of the respective second control signal line 131B. The second control signal line inspection lines 37A2 extend from the respective second control signal line inspection terminal 38A2 along the Y-axis direction toward the row control circuit 128 (or the display area AA). An end of each second control signal line inspection line 37A2 (an end away from the second control signal line inspection terminal 38A2) is arranged so as to overlap a portion (outer than a connecting point with the first line section 135 with respect to the X-axis direction) of the second line section 136 of the second control signal line 131B to which the second control signal line inspection line 37A2 is connected. The second control signal line inspection lines 37A2 and the portions of the second line sections 136 of the second control signal lines 131B to which the second control signal line inspection lines 37A2 are connected are electrically connected to each other via through holes CH formed in an insulating film (not illustrated). A configuration of each second control signal line inspection line 37A2 using the contract holes CH are similar to the configuration for connecting the first line section 33 or 35 to the second line section 34 or 36 in the first embodiment (see FIGS. 8 and 9). Two contact holes CH are formed in a portion corresponding to an overlapping portion between each second control signal line inspection line 37A2 and the corresponding second line section 136 for connecting the second control signal line inspection lines 37A2 to the second line sections 136 of the respective second control signal lines 131B. The contact holes CH are arranged along the X-axis direction that is the width direction of the second control signal line inspection line 37A2. Between two second control signal line inspection lines 37A2 parallel to each other, the second control signal line inspection lines 37A2 on the right in FIG. 11 crosses the second line section 136 of the other second control signal line 131B. The second control signal line inspection lines 37A2 is connected to the second line section 136 of the second control signal line 131B that is connected to a second panel-side control output terminal 124B2 located at the outermost. The second control signal line inspection line 37A2 closer to the middle in FIG. 11 is connected to the second line section 136 of the second control signal line 131B connected to the second panel-side control output terminal 124B2. A connecting point of the second line section 136 with the second control signal line inspection line 37A2 is closer to the row control circuit 128 than an intersection between the second line section 136 and the first control signal line inspection line 37A1.

An inspection pad that is not illustrated is brought into contact with the second control signal line inspection terminals 38A2 to inspect the second control signal lines 131B for electrical failures (continuity) such as breaks or short circuits. Each second control signal line 131B has different width in portions. The second line section 136 is narrower than the first line section 135 and thus more likely to break. The second control signal line 131B is connected to the second line section 136 and thus the break of the second line section 136 can be properly detected. The first line section 135 of each second control signal line 131B is wider and less likely to break. Therefore, the inspection using the second control signal line inspection lines 37A2 may not be necessary because failures resulting from the first line sections 135 are less likely to occur. This is effective for reducing a possibility of the liquid crystal panel 111 (or a liquid crystal display device) having failures to be shipped.

As described above, this embodiment includes the inspection line 37 connectable to the control signal lines 131 in the non-display area NAA for inspection of the control signal lines 131 for continuity. The inspection lines 37 include the first control signal line inspection lines (first inspection line) 37A1 and the second control signal line inspection lines (second inspection line 136) 37A2. The first control signal line inspection lines 37A1 are connected to the respective first control signal lines 131A. The second control signal line inspection lines 37A2 are connected to the sections (the first line sections 135) of the respective second control signal lines 131B closer to the display area AA than the sections having a larger line width (the second line sections 136). The first control signal lines 131A and the second control signal lines 131B are inspected for continuity with the first control signal line inspection lines 37A1 and the second control signal line inspection lines 37A2. The section of each second control signal line 131B having the smaller line width closer to the display area AA than the section having the larger line width is more likely to be broken. The second control signal line inspection line 37A2 is connected to the section and a break of the section having the smaller line width is detected at a high rate through the inspection. The section of each second control signal line 131B having the larger line width is less likely to break. Even if the inspection using the second control signal line inspection lines 37A2 is not performed, the liquid crystal display device including the second control signal line 131B that is broken is less likely to be shipped.

Third Embodiment

A third embodiment will be described with reference to FIG. 12. The third embodiment includes a driver 221 having a configuration different from the first embodiment and control signal lines 231, the number of which is different from the first embodiment. Configurations, functions, and effects similar to those of the first embodiment will not be described.

Figure 12:
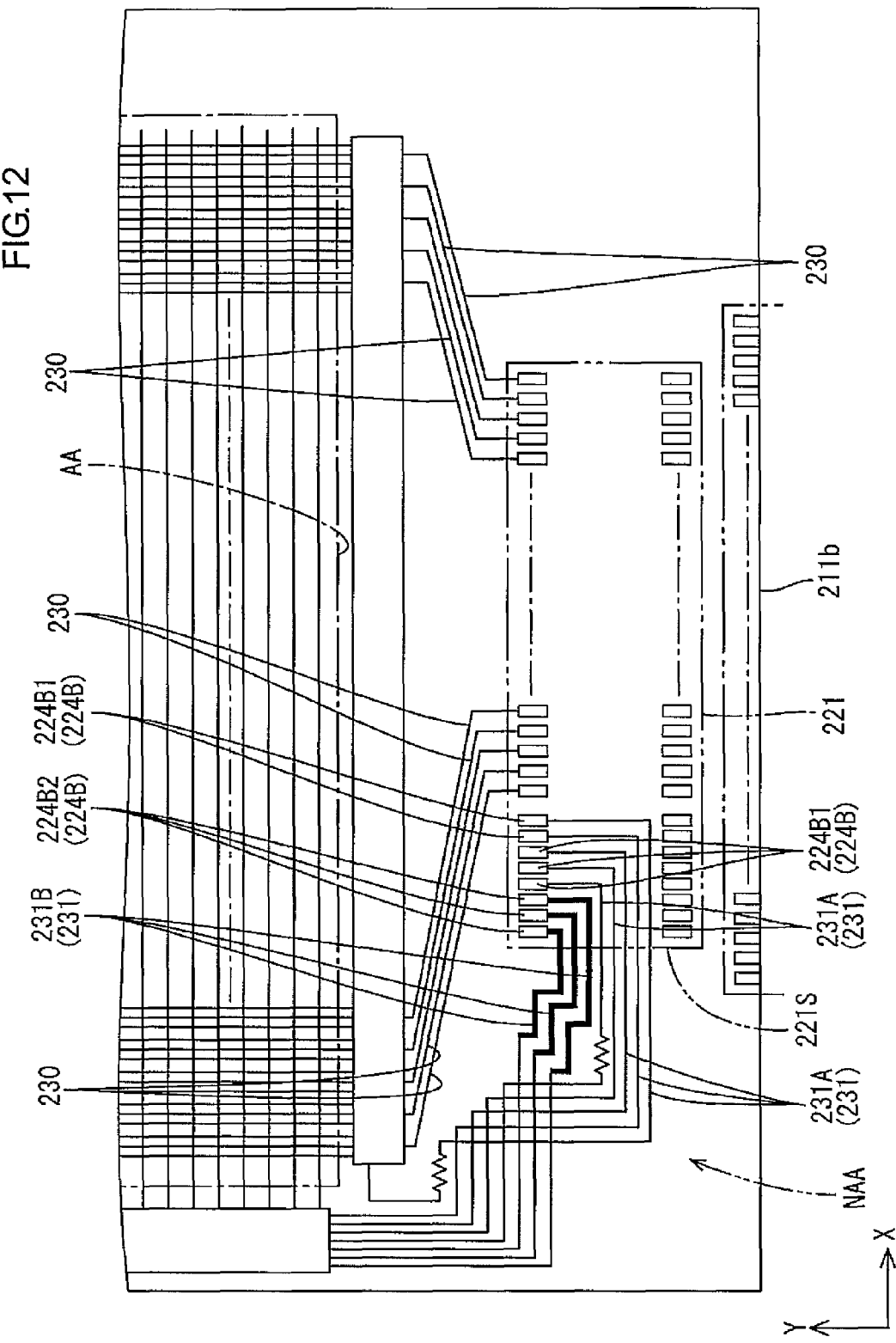
FIG. 12 is a plan view illustrating a configuration of lines at an end of an array board of a liquid crystal panel on which a driver and a flexible circuit board are mounted according to a third embodiment of the present invention.

As illustrated in FIG. 12, the driver 221 in this embodiment has short edges larger than the short edges of the driver 21 in the first embodiment (see FIG. 4). The driver 221 includes a VRAM (video RAM, graphic memory) for storing data related to images to be displayed in the display area AA and thus has a larger size in a short-side direction. With the driver 221 including the VRAM, power consumption of the liquid crystal panel can be reduced.

Eight control signal lines 231 and eight panel-side control output terminals 224B are disposed. The number of the control signal lines 231 and the number of the panel-side control output terminals 224B are larger (five each more) than those of control signal lines and the panel-side control output terminals in the first embodiment. The control signal lines 231 include five first control signal lines 231A and three second control signal lines 231B. The panel-side control output terminals 224B include five first panel-side control output terminals 224B1 and three second panel-side control output terminals 224B2. Eight control signal lines 231 extend from the respective panel-side control output terminals 224B in a direction opposite to the display area AA, bend, and cross a short edge 221S of the driver 221. The number of the control signal lines 231 is larger than the first embodiment. Because the driver 221 is larger in size along the short-side direction due to the VRAM included therein, all control signal lines 231 are routed so as to cross the short edge 221S of the driver 221. A sufficient size of space is provided for routing image signal lines 230 to spread in a fan-like form in a portion of the non-display area NAA between the driver 221 and the display area AA. Therefore, it is not necessary to expand the non-display area AA to create space for routing the image signal lines 230. This configuration is preferable for reducing a size of an array board 221*b* and a frame size.

Fourth Embodiment

A fourth embodiment will be described with reference to FIG. 13. The fourth embodiment includes second control signal lines 331B that include first line sections 335, each of which has a line width different from the first embodiment. Configurations, functions, and effects similar to those of the first embodiment will not be described.

Figure 13:
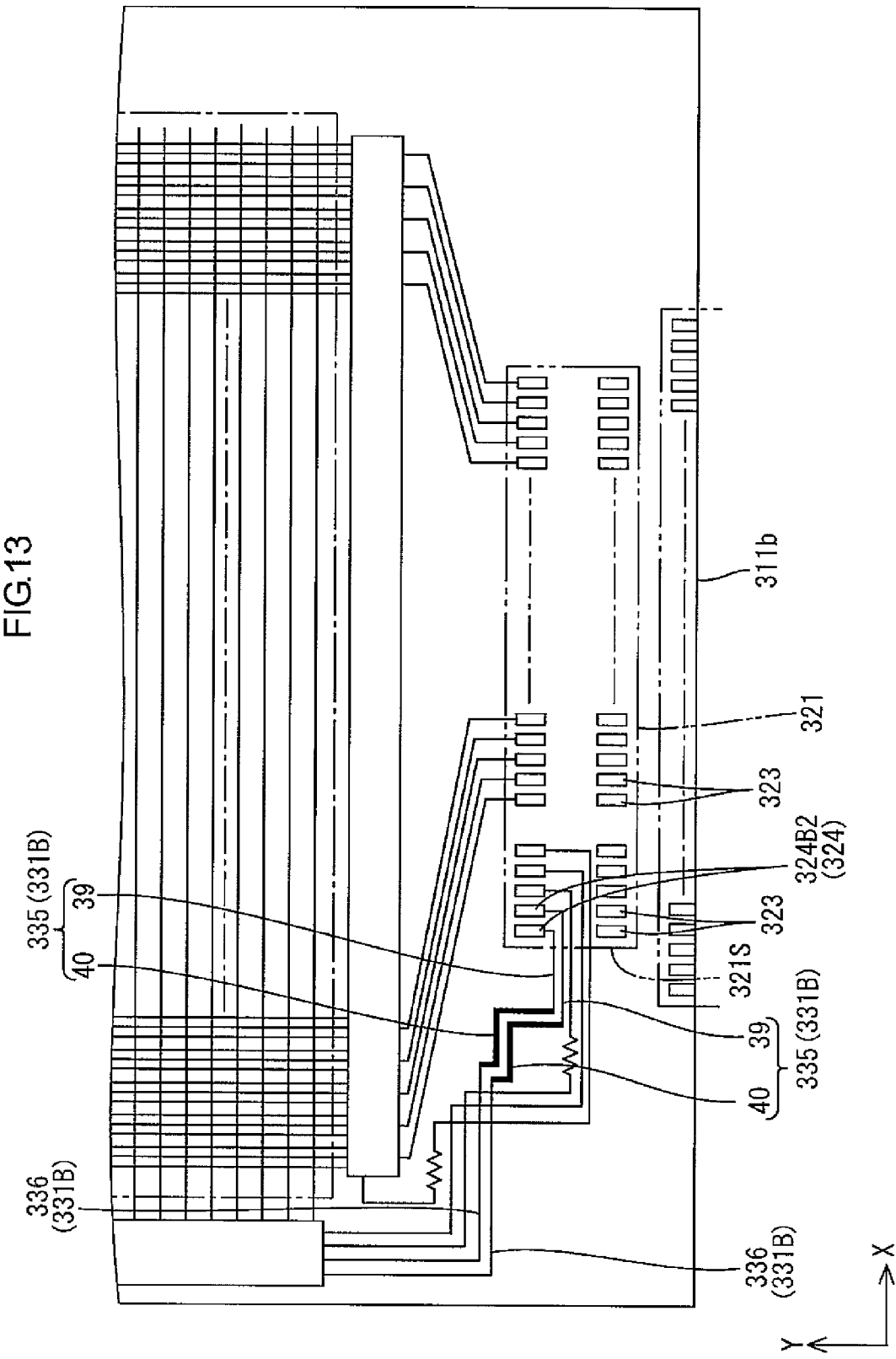
FIG. 13 is a plan view illustrating a configuration of lines at an end of an array board of a liquid crystal panel on which a driver and a flexible circuit board are mounted according to a fourth embodiment of the present invention.

As illustrated in FIG. 13, second control signal lines 331B in this embodiment include first line sections 335. Each first line section 335 includes a narrow portion 39 and a wide portion 40, that is, a width of the first line section 335 varies in portions. A portion of the first line section 335 of each second control signal line 331B between the second panel-side control output terminal 324B2 and the second bending point, that is, a portion connected to the second panel-side control output terminal 324B2 and crossing a short edge 321S of a driver 321 is defined as the narrow portion 39 having the smaller line width. The rest of the first line section 335 of each second control signal line 331B between the second bending point and a connecting point at which connected with a second line section 336 is defined as the wide portion 40 having the larger line width. The narrow portion 39 is disposed inside and outside a driver 321 mounting area. The entire area of the wide portion 40 is arranged outside the driver 321 mounting area. The line width of the narrow portion 39 is about equal to the line width of the second line section 336. As described above, the portion of the second control signal line 331B between the second panel-side control output terminal 324B2 and the point at which the second control signal line 331B crosses the short edge 321S of the driver 321 is defined as the narrow portion 39. This configuration is preferable for a configuration in which a distance between the panel-side output terminal 324 and the panel-side input terminal 323 is small, that is, the driver 321 is reduced in size related to the short edge 321S as the size of the array board 311b and the frame size are further reduced.

Fifth Embodiment

A fifth embodiment will be described with reference to FIG. 14. The fifth embodiment includes first panel-side control output terminals 424B1, second panel-side control output terminals 424B2, first control signal lines 431A, and second control signal lines 431B arranged differently from the fourth embodiment. Furthermore, a line width of first line sections 435 is different from the fourth embodiment. Configurations, functions, and effects similar to those of the fourth embodiment will not be described.

Figure 14:
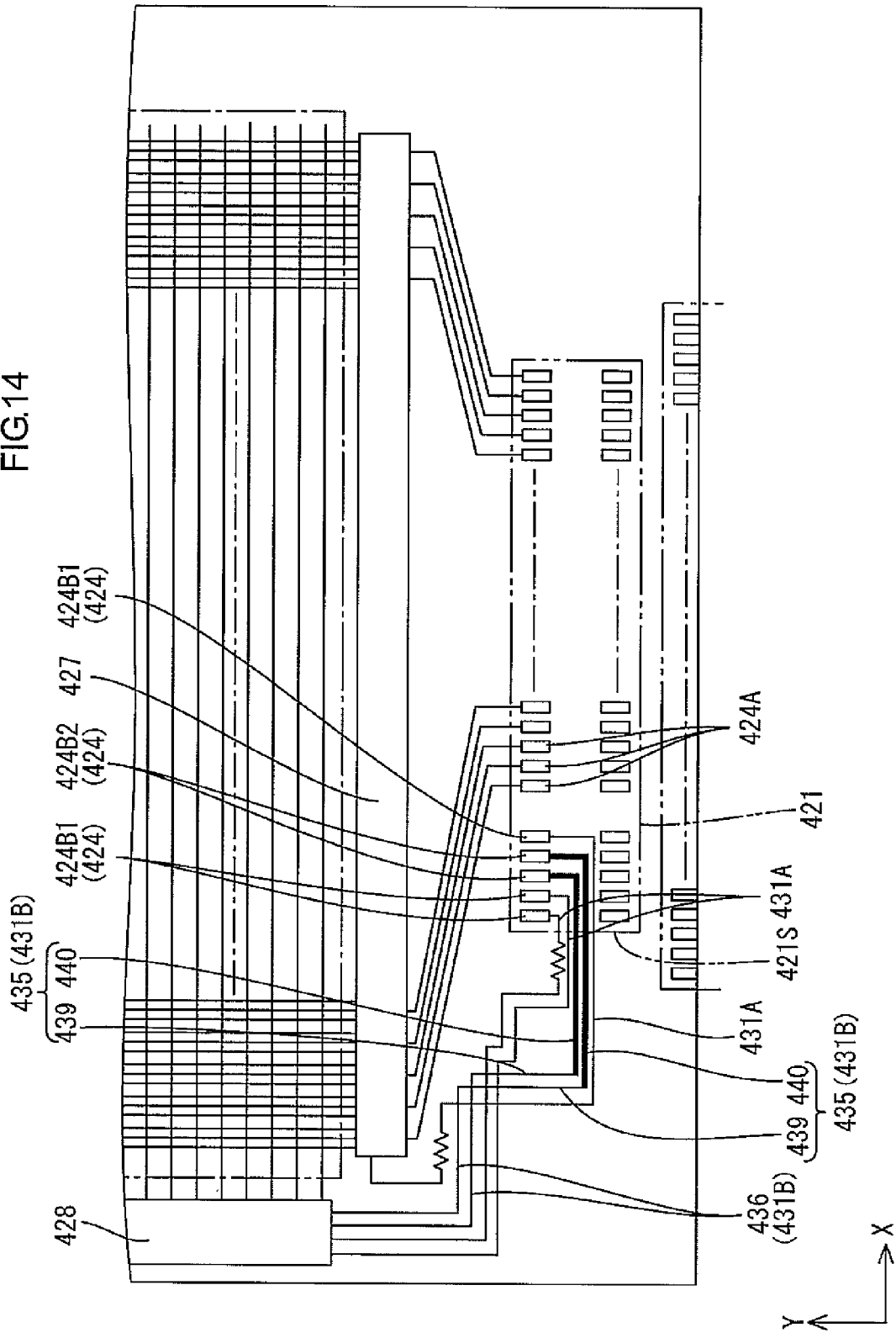
FIG. 14 is a plan view illustrating a configuration of lines at an end of an array board of a liquid crystal panel on which a driver and a flexible circuit board are mounted according to a fifth embodiment of the present invention.

As illustrated in FIG. 14, the second panel-side control output terminals 424B2 in this embodiment are arranged between the first panel-side control output terminals 424B1 with respect to the X-axis direction. The first panel-side control output terminal 424B1 to which the first control signal line 431A that are connected to a column control circuit 427 is connected is disposed adjacent to a group of the panel-side image output terminals 424A. Two second panel-side control output terminals 424B2 are disposed between the first panel-side control output terminal 424B1 to which the first control signal line 431A that is connected to the column control circuit 427 and the first panel-side control output terminals 424B1 to which the first control signal lines 431A that are connected to the row control circuit 428. The second control signal lines 431B are routed similar to the first control signal lines 31A in the first embodiment described earlier (see FIG. 4). The first control signal lines 431A connected to the row control circuit 428 are routed similar to the second control signal lines 31B in the first embodiment described earlier (see FIG. 4). Similar to the fourth embodiment, each second control signal line 431B includes a narrow portion 439 and a wide portion 440, that is, the line width of a first line section 435 is different in portions. A portion of the first line section 435 of each second control signal line 431B between the second panel-side control output terminal 424B2 and a second bending point, that is, a portion connected to the second panel-side control output terminal 424B2 and crossing a short edge 421S of a driver 421 is define as the wide portion 440 having the larger width. The rest of the portion of the first line section 435, that is, a portion between the second bending point and the connecting point with a second line section 436 is defined as the narrow portion 439 having the smaller line width. The line width of the narrow portion 439 is about equal to the line width of the second line section 436.

Sixth Embodiment

A Sixth embodiment will be described with reference to FIG. 15. The sixth embodiment includes second control signal lines 531B each including a first line section 535 and a second line section 536. A relationship in line width between the first line section 535 and the second line section 536 is the other way around from that in the first embodiment. Configurations, functions, and effects similar to those of the first embodiment will not be described.

Figure 15:
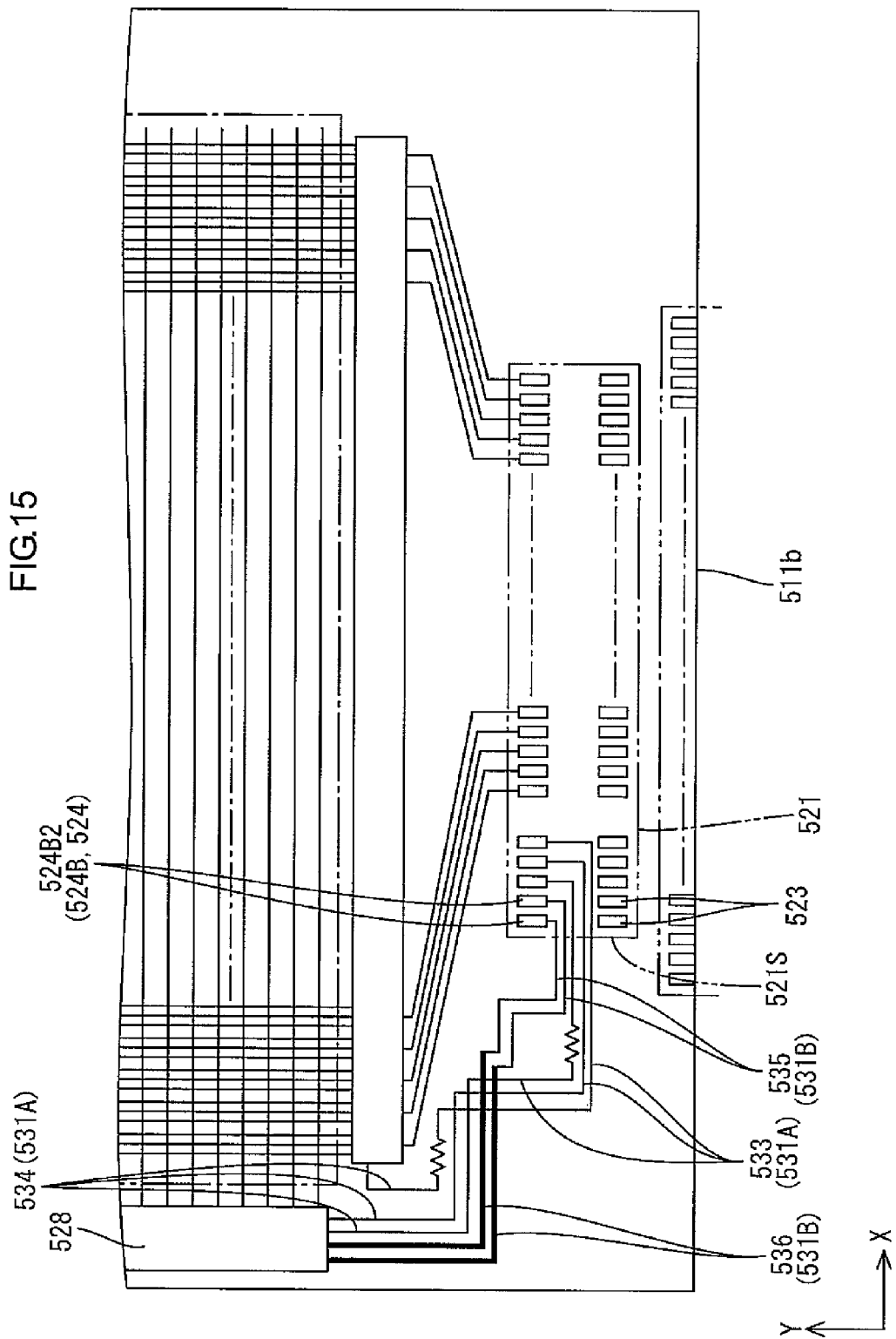
FIG. 15 is a plan view illustrating a configuration of lines at an end of an array board of a liquid crystal panel on which a driver and a flexible circuit board are mounted according to a sixth embodiment of the present invention.

As illustrated in FIG. 15, a line width of a second line section 536 of each second control signal line 531B in this embodiment is larger than a line width of a first line section 535, that is, the second line section 536 is widened. The first line section 535 of the second control signal line 531B is disposed inside a driver 521 mounting area and connected to the second panel-side control output terminal 524B2. The first line section 535 includes at least a portion that crosses a short edge 521S of a driver 521. The first line section 535 is defined as a narrow section having s smaller line width. The second line section 536 is arranged outside the driver 521 mounting area for the entire area thereof and connected to the row control circuit 528. The second line section is defined as a wide portion having a larger line width. The line width of the first line section 535 and the second line section 536 of each second control signal line 531B are substantially constant (do not change) for entire lengths thereof, respectively. The line width of the first line section 535 is about equal to the line width of the first control signal line 531A (the first line section 533 and the second line section 534). Only the second line section 536 of the second control signal line 531B is wider than the first control signal line 531A. As described above, the first line section 535 of each second control signal line 531B between the second panel-side control output terminal 524B2 and the point at which the second control signal line 531B crosses the short edge 521S of the driver 521 has the smaller width. This configuration is preferable for a configuration in which a distance between the panel-side output terminal 524 and the panel-side input terminal 523 is small, that is, the driver 521 is reduced in size related to the short edge 521S as the size of the array board 511b and the frame size are further reduced.

Seventh Embodiment

A seventh embodiment will be described with reference to FIG. 16. The seventh embodiment includes first control signal lines 631A and second control signal lines 631B routed differently from the first embodiment. Configurations, functions, and effects similar to those of the first embodiment will not be described.

Each first control signal line 631A in this embodiment is connected to the row control circuit 628 and includes a serpentine portion 632. As illustrated in FIG. 16, the serpentine portion 632 is formed in a portion of a second line section 634. The serpentine portion 632 of the second line section 634 is located closer to a connecting point with a first line section 633. The first line section 635 of each second control signal line 631B crosses a short edge 631S of a driver 621 and extends outward along the X-axis direction. Then, the first line section 635 bends at an about right angle toward the column control circuit 627 along the Y-axis direction and bends at angled to the X-axis direction and the Y-axis direction. Then, the first line section 635 extends outward for a predefined length and an end of the first line section 635 is connected to the second line section 636.

Eighth Embodiment

An eighth embodiment will be described with reference to FIG. 17. The eighth embodiment includes inspection lines 737 and inspection terminals 738 having configurations similar to those in the second embodiment in addition to the seventh embodiment. Configurations, functions, and effects similar to the second and the seventh embodiments will not be described.

As illustrated in FIG. 17, the inspection lines 737 and the inspection terminals 738 are formed from the first metal film that also forms first line sections 733 and 735 of control signal lines 731A and 731B. The number of the inspection lines 737 and the number of the inspection terminals 738 are equal to the number of the control signal lines 731A and the number of the control signal lines 731B (five each). The inspections lines 737 extend from the respective inspection terminals 738 along the Y-axis direction. The inspection lines 737 are connected to second line sections 734 and 736 of the control signal lines 731A and 731B via contact holes that are not illustrated.

Ninth Embodiment

A ninth embodiment will be described with reference to FIG. 18. The ninth embodiment includes first control signal lines 831A routed differently from the first embodiment. Configurations, functions, and effects similar to those of the first embodiment will not be described.

As illustrated in FIG. 18, each first control signal line 831A in this embodiment includes a first line section 833 that crosses a second control signal line 831B and a second line section 834 that does not cross the second control signal line 831B. The first line section 833 of the first control signal line 831 that is connected to the column control circuit 827 extends from a first panel-side control output terminals 824B1 adjacent to the second panel-side control output terminal 824B2. The first control signal line 831 is routed such that the first line section 833 crosses the second control signal lines 831B. Furthermore, the first control signal line 831 is routed such that the second line section 834 including a serpentine portion 832 is connected to the column control circuit 827 without crossing the other first control signal lines 831A. The first control signal lines 831A that do not include serpentine portions 832 and are connected to a row control circuit 828 are routed such that the first line sections 833 thereof extend from first panel-side control output terminals 824B1 adjacent to a group of the panel-side image output terminals 824A and cross the second control signal lines 831B. The first control signal line 831A that includes a serpentine portion 832 and is connected to the row control circuit 828 is routed such that the first line section 833 extends from the first panel-side control output terminal 824B1 between the first panel-side control output terminals 824B1 connected to other first control signal lines 831A and crosses the second control signal lines 831B. Furthermore, the first control signal line 831A is routed such that the second line section 834 having the serpentine portion 834 is connected to the row control circuit 828 without crossing other first control signal lines 831A. In this embodiment, the first control signal lines 831A and the second control signal lines 831B cross one another; however, the first control signal lines 831A do not cross one another and the second control signal lines 831B do not cross one another.

Tenth Embodiment

A tenth embodiment will be described with reference to FIG. 19. The tenth embodiment includes first control signal lines 931A and second control signal lines 931B routed differently from the first embodiment. Configurations, functions, and effects similar to those of the first embodiment will not be described.

As illustrated in FIG. 19, control signal lines 931 in this embodiment are routed so as not to cross one another. Panel-side control output terminals 924B include first panel-side output terminals 924B2 and second panel-side control output terminals 924B2 arranged the other way around from the first embodiment. Among the panel-side output terminals 924, the second panel-side control output terminals 924B2 to which the second control signal lines 931B are connected are arranged adjacent to a group of panel-side output terminals 924A. Among the panel-side output terminals 924, the first panel-side control output terminals 924B1 to which the first control signal lines 931A are connected are arranged away from the group of panel-side output terminals 924A (at an end of the group of the panel-side output terminal).

The first control signal line 931A that is connected to a column control circuit 927 extends from the first panel-side control output terminal 924B1 located at the outermost. The first control signal line 931A includes a second line section 934 that includes a serpentine portion 932. The first control signal line 931A is connected to the column control circuit 927. The first control signal line 931A that is connected to a row control circuit 928 and does not include the serpentine portion 932 extends from the first panel-side control output terminal 924B1 adjacent to the second panel-side control output terminal 924B2. The first control signal line 931A includes a second line section 934 that is parallel to other second line sections 934. The first control signal line 931A is connected to the row control circuit 928. The first control signal line 931A that is connected to the row control circuit 928 and includes the serpentine portion 932 extends from the first panel-side control output terminal 924B1 between the first panel-side control output terminals 924B1 that are connected to other first control signal lines 931A. The first control signal line 931A includes a second line section 934 that is parallel to other second line sections 934. The first control signal line 931A is connected to the row control circuit 928. Two second control signal lines 931B are routed such that the first line sections 935 and the second line sections 936 are parallel to the first line sections 933 and the second line sections 934 of the first control signal lines 931A connected to the row control circuit 928. In this embodiment, the first control signal lines 931A do not cross one another and the second control signal lines 931B do not cross each other. Furthermore, the first control signal lines 931A do not cross the second control signal lines 931B.

Other Embodiments

The technology is not limited to the above embodiments described in the above description and the drawings. For example, the following embodiments may be included in technical scopes of the present invention.

(1) In each of the above embodiments, the external connection terminals, the panel-side input terminals, and the panel-side output terminals are formed from the first metal film that also forms the gate lines. However, they may be formed from the second metal film that also forms the source lines.

(2) In each of the above embodiments, the first line sections of the image signal lines and the control signal lines are formed from the first metal film that also forms the gate lines. The second line sections are formed from the second metal film that also forms the source lines. However, the first line sections may be formed from the second metal film and the second line sections may be formed from the first metal film.

(3) The portions of the control signal lines in which the first line sections are formed and in which the second line sections are formed may be altered from those in each of the above embodiments as appropriate.

(4) In each of the above embodiments (except for the sixth embodiment), the line width of the second line section of each second control signal line is smaller than that of the first line section (the wide section) and about equal to that of each first control signal line. However, the line width of the second line section of each second control signal line may be smaller than that of the first line section (the wide section) and larger than that of each first control signal line or smaller than that of each first control signal line. In the sixth embodiment, the line width of the first line section of each second control signal line is smaller than that of the second line section and about equal to that of each first control signal line. However, the line width of the first line section of each second control signal line may be smaller than that of the second line section and the larger than that of each first control signal line or smaller than that of the first control signal line. Furthermore, in each of the above embodiments, the line widths of the first line section and the second line section of each second control signal line may be about equal to each other and larger than that of each first control signal line. Namely, the second control signal line may have a constant line width for an entire length thereof.

(5) In each of the above embodiments, the panel-side output terminals and the first line sections of the control signal lines that extend from the panel-side output terminals are formed from the first metal film. However, the panel-side output terminals and the first line sections of the control signal lines may be formed from the second metal film. The panel-side output terminals and the first line sections of the control signal lines that extend from the panel-side output terminals may be formed from different metal films. In such a configuration, the insulating film may have contact holes in portions that overlap the panel-side output terminals and the first line sections.

(6) In each of the above embodiments, the image signal lines and the control signal lines are formed from two kinds of metal films. However, the image signal lines and the control signal lines may be formed from more than two kinds of metal films. For example, if three kinds metal films are used, each of the image signal lines and the control signal lines may include the first line section formed from the first metal film, the second line section formed from the second metal film that is layered on the first metal film via the insulating film, and the third line section formed from the third metal film that is layered on the second metal film via the insulating film. In this configuration, the line widths of the first line section, the second line section, and the third line section may be different from one another, that is, they may be provided with three different line widths (the same number as the number of the kinds of the metal film). Alternatively, any two of the line sections may have the same line width and the remaining one of the line sections may have a light width different from the other two.

(7) In each of the above embodiments, each first control signal line and each second control signal line have the different numbers of the contact holes for connecting the first line sections to the respective second line sections. However, the first control signal line and the second control signal line may have the same number of the contact holes. In this configuration, it is preferable for defining a connecting area of the second control signal line larger than a connecting area of the first control signal line. The first control signal line may have the number of the contact holes larger than the second control signal line.

(8) The numbers of the contact holes for connecting the first line sections of the control signal line with the second line sections of the control signal lines may be altered from the above embodiments as appropriate.

(9) Each control signal line may extend from the panel-side control output terminal at an angle other than 180 degrees relative to the image signal line from the panel-side image output terminal.

(10) The number of the control signal lines may be altered from those in the above embodiments. The number of the first control signal lines and the number of the second control signal lines may be altered as appropriate. The number of the first signal lines may be smaller than the number of the second signal lines. The number of the first signal lines may be equal to the number of the second signal lines. The kind of signals transmitted through the controls signal lines may be altered as appropriate.

(11) In each of the above embodiments, the first control signal lines include one that is connected to the column control circuit. However, the second control signal lines may include one that is connected to the column control circuit.

(12) In the above embodiments, the first control signal lines include those including serpentine portions. However, the serpentine portions may be replaced with small-width portions formed by partially reducing widths of the first control signal lines to increase resistances. The purpose of the serpentine portions is to provide resistance portions for increasing the line resistances in portions of the first control signal lines. Therefore, structures other than serpentine portions are acceptable as long as the purpose is achieved.

(13) The inspection lines and the inspection terminals in the second embodiment are for inspections in the production process of the liquid crystal panels. However, the inspection lines and the inspection terminals may be used for driving the liquid crystal panels.

(14) The connecting points of the control signal line inspection lines to the second control signal lines may be modified from the second embodiment. For example, the inspection lines may be connected to the first line sections of the control signal lines. The inspection lines and the inspection terminals may be formed from the second metal film rather than the first metal film. Furthermore, the inspection lines and the inspection terminals may be formed from different metal films. In this configuration, the contact holes may be formed in portions of the insulating film overlap both inspection lines and inspection terminals.

(15) In the second embodiment, the inspection lines are connected to all control signal lines, respectively. However, the inspection lines may be connected to only some of the control signal lines. Furthermore, a single inspection line may be connected to multiple control signal lines.

(16) The third embodiment includes the driver including the VRAM and the larger number of the control signal lines in comparison to the first embodiment. The first embodiment may be modified by replacing the diver with a drive including VRAM without altering the number of the control signal lines. The first embodiment may be modified by replacing the driver with a driver including VRAM and reducing the number of the control signal lines.

(17) Other than the fourth and the fifth embodiments, the portions of the second control signal lines in which the wide portions and the narrow portions of the first line sections are formed may be altered as appropriate.

(18) In the fourth and the fifth embodiments, the first line section of each second control signal line has two different line widths. However, the first line section of each second control signal line may have three or more different line widths.

(19) In the fifth embodiment, the routing of the second control signal lines and the portions of the first line sections in which the wide portions (or the narrow portions) are formed are altered. However, only the routing of the second control signal lines may be altered as in the fifth embodiment or the portions of the second control signal lines in which the wide portions (or the narrow portions) of the first line sections are formed may be altered as in the fifth embodiment.

(20) In the sixth embodiment, each second control signal includes the second line section that has the constant line width for the entire length thereof. Similar to the fourth and the fifth embodiments, the second line section of each second control signal line may have a wide portion, that is, include both wide portion and narrow portion. Furthermore, the second line section of each second control signal line may have three or more different line widths.

(21) The configuration of the second embodiment, that is, the inspection lines and the inspection terminals may be added to the configurations of the fourth to the six, the ninth, and the tenth embodiment.

(22) In the ninth embodiment, the first control signal lines cross the second control signal lines, the first control signal lines do not cross one another, and the second control signal lines do not cross one another. The first control signal lines may be formed from any one of the first metal film and the second metal film and the second control signal lines may be formed from the other one of the first metal film and the second metal film.

(23) A modification of the tenth embodiment may include control signal lines formed from a single metal film (the first metal film or the second metal film).

(24) In each of the above embodiments, the row control circuit is disposed at the long edge of the array board. A configuration in which row control circuits are disposed at long edges of the array board, respectively, may be included in the scope of the present invention. In this configuration, the panel-side control output terminals may be disposed at each long edge of the driver.

(25) The arrangements of the panel-side control output terminals and the routing of the control signal lines may be altered from those in the above embodiments as appropriate.

(26) In each of the above embodiments, the column control circuit and the row control circuit are disposed in the non-display area of the array board. However, the column control circuit and the row control circuit may be omitted. In such a configuration, the control signal lines may have the same line width. Other than such a configuration, the control signal lines on the array board on which the column control circuit and the row control circuit are disposed may have the same line width.

(27) In each of the above embodiments, the semiconductor films in the TFTs, the column control circuit, and the row control circuit are CG silicon thin films. However, other kinds of semiconductor films such as amorphous silicon (a-Si) films and oxide semiconductor (IGZO:InGaZnOx) films may be used.

(28) In each of the above embodiments, the liquid crystal panel has a vertically long rectangular shape. However, horizontally long rectangular liquid crystal panels and square liquid crystal panels are included in the scope of the present invention.

(29) A functional panel overlaid and attached to the liquid crystal panel in each of the above embodiments may be included in the scope of the present invention. The functional panel may be a touch panel or a parallax barrier panel (a switch liquid crystal panel).

(30) In each of the above embodiments, the edge-light type backlight unit is used. However, a direct type backlight unit may be used.

(31) In each of the above embodiments, the transmissive liquid crystal display device including the backlight unit, which is an external light source, is provided. However, a reflective liquid crystal display device using ambient light for display is included in the scope of the present invention. In this case, the backlight unit is not required.

(32) In each of the above embodiments, the TFTs are used for switching components of the liquid crystal display device. However, a liquid crystal display device including switching components other than the TFTs (e.g., thin film diodes (TFDs)) is included in the scope of the present invention. A color liquid crystal display and a black-and-white liquid crystal display are also included in the scope of the present invention.

(33) In each of the above embodiments, the liquid crystal display device including the liquid crystal panel as a display panel is provided as an example. However, a display device including other kind of display panel (e.g., a plasma display panel) and a display device including organic EL panel are included in the scope of the present invention. In such display devices, the backlight unit is not required.

(34) In each of the above embodiments, the liquid crystal panel that is classified as a small sized or a small to middle sized display and used for PDAs, mobile phones, notebook computers, digital photo frames, portable video games, and electronic papers is provided as an example. Liquid crystal panels that are classified as middle sized or large sized (or supersized) displays having screen sizes from 20 inches to 90 inches are included in the scope of the present invention. Such display panels may be used in electronic devices such as television devices, digital signage, and electronic blackboard.

EXPLANATION OF SYMBOLS

10: liquid crystal display device (display device), 11, 111: liquid crystal panel (display panel), 11a: CF board (board), 11b, 111b, 211b, 311b, 511b: alley board (board), 11c: liquid crystal layer (liquid crystal), 12: control circuit board (external signal source), 14: backlight unit (lighting unit), 17: TFT (switching component), 21, 121, 221, 321, 421, 521, 621: driver (panel driver), 21L: long edge, 21S, 221S, 321S, 421S, 521S, 621S: short edge, 23, 123, 323, 423, 523: panel-side input terminal, 24, 124, 324, 524, 924: panel-side output terminal, 24A, 424A, 824A: panel-side image output terminal (panel-side output terminal), 24B, 124B, 224B, 324B, 524B, 924B: panel-side control output terminal (panel-side output terminal), 24B1, 124B1, 224B1, 424B1, 924B1: first panel-side control output terminal (panel-side output terminal), 24B2, 124B2, 224B2, 324B2, 424B2, 524B2, 824B2, 924B2: second panel-side control output terminal (panel-side output terminal), 27, 127, 427, 627, 927: column control circuit, 28, 128, 228, 428, 528, 628, 928: row control circuit, 30, 230: image signal line, 31, 131, 231, 931: control signal line, 31A, 131A, 231A, 431A, 531A, 631A, 731A, 831A, 931A: first control signal line, 31B, 131B, 231B, 331B, 431B, 531B, 631B, 731B, 831B, 931B: second control signal line (clock control signal line, power supply control signal line), 32, 132, 632, 832, 932: serpentine portion, 33, 133, 533, 633, 733, 833, 933: first line section, 34, 134, 534, 634, 734, 834, 934: second line section, 35, 135, 335, 435, 535, 635, 735, 935: first line section, 36, 136, 336, 436, 536, 636, 736, 936: second line section, 37, 737: inspection line, 37A: control signal line inspection line (inspection line), 37A1: first control signal line inspection line (first inspection line), 37A2: second control signal line inspection line (second inspection line), AA: display area, CH: contact hole, IF: insulating film, NAA: non-display area

The invention claimed is:

1. A display device comprising:
   a display panel including a display area configured to display images and a non-display area outside the display area;
   a panel driver mounted in the non-display area and configured to generate output signals by processing input signals supplied by an external signal source and to transmit the output signals to the display area to drive the display panel, the panel driver having an elongated shape along an edge of the display panel;
   a plurality of panel-side output terminals disposed in the non-display area and connected to the panel driver, the panel-side output terminals include:
      a plurality of panel-side image output terminals disposed along a long edge of the panel driver; and
      a plurality of panel-side control output terminals disposed along the long edge of the panel driver;
   a plurality of image signal lines for transmitting image signals in the output signals, the plurality of image signal lines being routed so as to extend from the panel-side image output terminals, to cross the long edge of the panel driver, and to spread in a fan-like form toward the display area; and
   a plurality of control signal lines for transmitting control signals in the output signals, the plurality of control signal lines being disposed in the non-display area and routed so as to extend from the panel-side control output terminals toward the display area and to cross a short edge of the panel driver.

2. The display device according to claim 1, wherein the plurality of control signal lines include at least a first control signal line and a second control signal line that includes at least a section having a line width larger than the first control signal line.

3. The display device according to claim 2, wherein the plurality of panel-side control output terminals include:
   a first panel-side control output terminal to which the first control signal line is connected and disposed adjacent to one of the plurality of panel-side image output terminals located at an outermost; and
   a second panel-side control output terminal to which the second control signal line is connected and disposed such that the first panel-side control output terminal is between the one of the plurality of panel-side image output terminals located at the outermost and the second panel-side control output terminal.

4. The display device according to claim 2, further comprising an insulating film, wherein
   the first control signal line and the second control signal line include at least first line sections and second line sections, the first line sections being disposed closer to the panel-side control output terminals, the second line sections being disposed farther from the panel-side control output terminals including portions overlapping portions of the first line sections,
   the insulating film is disposed between the first line sections and the second line sections and includes contact holes in portions overlapping the first line sections and the second line sections for connecting the first line sections to the second line sections, and
   a number of the contact holes for connecting the first line section of the second control signal line to the second line section thereof is larger than a number of the contact holes for connecting the first line section of the first control signal line to the second line section thereof.

5. The display device according to claim 2, further comprising:
   a plurality of switching components disposed in a matrix in the display area; and
   a row control circuit and a column control circuit in the non-display area, the row control circuit being connected to at least ends of the control signal lines closer to the display area and configured to control supply of the control signals to the switching components, the column control circuit being connected to at least ends of the image signal lines closer to the display area and configured to control supply of the image signals to the switching components.

6. The display device according to claim 5, wherein
   the second control signal line includes at least a clock control signal line and a power supply control signal line,
   the clock control signal line is for transmitting clock signals of the control signals, and
   the power supply control signal line is for transmitting power supply control signals of the control signals for driving the row control circuit and the column control circuit.

7. The display device according to claim 5, wherein
   the first control signal line includes a serpentine portion formed in a serpentine shape, and
   at least one of the row control circuit and the column control circuit includes an ESD protection circuit electrically connected to the first control signal line that includes the serpentine portion.

8. The display device according to claim 5, wherein the switching components, the row control circuit, and the column control circuit include polycrystalline silicon thin films.

9. The display device according to claim 2, wherein the second control signal line includes at least a portion that extends from the panel-side control output terminal and crosses the short edge of the panel driver has a larger line width.

10. The display device according to claim 9, further comprising inspection lines disposed in the non-display area, the inspection lines being connected to the control signal lines for inspection of the control signal lines for continuity, wherein the inspection lines include a first inspection line connected to the first control signal line and a second inspection line connected to a portion of the second control signal line closer to the display area than the portion having the larger line width.

11. The display device according to claim 1, wherein the control signal lines extend from the panel-side control output terminals in a direction opposite to a direction in which the image signal lines extend from the panel-side image output terminals.

12. The display device according to claim 1, wherein the plurality of panel-side control output terminals are disposed at an end of the long edge of the panel driver.

13. The display device according to claim 1, further comprising panel-side input terminals connected to the panel driver and disposed relative to the panel-side output terminals along the short edge of the panel driver in the non-display area, wherein the control signal lines are routed between the panel-side output terminals and the panel-side input terminals.

14. The display device according to claim 1, wherein the display panel is a liquid crystal display panel including a pair of substrates and liquid crystals sealed between the substrates.

15. The display device according to claim 14, further comprising a lighting device arranged opposite the liquid crystal panel and away from a display surface of the liquid crystal panel, the lighting device being configured to provide the liquid crystal panel with light.

* * * * *